US012792030B2

(12) United States Patent
Iskandar et al.

(10) Patent No.: US 12,792,030 B2
(45) Date of Patent: Nov. 10, 2026

(54) EXCURSION SCREENING MODELS FOR IMPROVING ACCURACY OF EXCURSION DETECTION WITHIN MANUFACTURING SYSTEMS

(71) Applicant: Applied Materials, Inc., Santa Clara, CA (US)

(72) Inventors: Jimmy Iskandar, Fremont, CA (US); Michael D. Armacost, San Jose, CA (US); Peter J. Lindner, Saratoga Springs, NY (US); Michael Olstad, Round Rock, TX (US); Malcolm Delaney, Los Gatos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 365 days.

(21) Appl. No.: 18/519,164

(22) Filed: Nov. 27, 2023

(65) Prior Publication Data

US 2025/0172931 A1 May 29, 2025

(51) Int. Cl.
*G05B 23/02* (2006.01)

(52) U.S. Cl.
CPC ....... *G05B 23/0272* (2013.01); *G05B 23/024* (2013.01)

(58) Field of Classification Search
CPC .......................... G05B 23/0272; G05B 23/024
See application file for complete search history.

(56) References Cited

U.S. PATENT DOCUMENTS

| | | | |
|---|---|---|---|
| 8,180,587 B2 | 5/2012 | Cross, Jr. et al. | |
| 2017/0261971 A1* | 9/2017 | Schulze | G05B 23/0232 |
| 2019/0277913 A1 | 9/2019 | Honda et al. | |
| 2020/0210873 A1 | 7/2020 | Cantwell | |
| 2022/0019863 A1* | 1/2022 | Iskandar | G06F 18/15 |

FOREIGN PATENT DOCUMENTS

| | | |
|---|---|---|
| KR | 20230065586 A | 5/2023 |
| WO | 2023129690 A1 | 7/2023 |

OTHER PUBLICATIONS

De Vitry, Louis, Gramian Angular Field Imaging, "Encoding Time Series as Images," https://medium.com/analytics-vidhya/encoding-time-series-as-images-b043becbdbf3, 20 pages, Oct. 14, 2018.
Finn, Chelsea, et al, "Model-Agnostic Meta-Learning for Fast Adaptation of Deep Networks", [retrieved from the internet on Nov. 27, 2023], 10 pages.
Garcia, Victor and Bruna, Joan, "Few-Shot Learning With Graph Neural Networks", Published as a conference paper at ICLR 2018, 13 pages.

(Continued)

*Primary Examiner* — Christopher W Carter
(74) *Attorney, Agent, or Firm* — Lowenstein Sandler LLP

(57) ABSTRACT

A method includes identifying at least one excursion corresponding to sensor data obtained from a manufacturing system, initiating an excursion screening process to screen the at least one excursion using an excursion screening model, wherein the excursion screening model is trained to classify the at least one excursion, and causing a screening output resulting from the screening process to be displayed on a user device.

20 Claims, 11 Drawing Sheets

(56) References Cited

OTHER PUBLICATIONS

Gidaris, Spyros and Komodakis, Nikos, "Dynamic Few-Shot Visual Learning without Forgetting", [retrieved from the internet on Nov. 27, 2023], 9 pages.
Rodriguez, Pau, et al., "Embedding Propagation: Smoother Manifold for Few-Shot Classification", https://www.ecva.net/papers/eccv_2020/papers_ECCV/papers/123710120.pdf, [retrieved from the internet on Nov. 27, 2023], 17 pages.
Han, Bin, et al., College of Computer and Control Engineering, Qiqihar University, Qiqihar 161003, China, "A New Bearing Fault Diagnosis Method Based on Capsule Network and Markov Transition Field/Gramian Angular Field", https://www.mdpi.com/1424-8220/21/22/7762, 15 pages, Published: Nov. 22, 2021.
Chapelle, Olivier and Zien, Alexnader, Max Planck Institute for Biological Cybernetics, "Semi-Supervised Classification by Low Density Separation", https://proceedings.mlr.press/r5/chapelle05b/chapelle05b.pdf, [retrieved from the internet on Nov. 27, 2023], 8 pages.
GitHub—vgsatorras/few-shot-gnn, "Few-Shot Learning with Graph Neural Networks", https://github.com/vgsatorras/few-shot-gnn, [retrieved from the internet on Nov. 27, 2023], 4 pages.
MAML-Pytorch, GitHub—fmu2/PyTorch-MAML: A PyTorch implementation of Model Agnostic Meta-Learning (MAML) that faithfully reproduces the results from the original paper, https://github.com/Gauravlyer/MAML-Pytorch, [retrieved from the internet on Nov. 27, 2023], 3 pages.
MATLAB Answers, "Generate a weighted graph and an adjacency matrix from an image matrix", https://www.mathworks.com/matlabcentral/answers/217894-generate-a-weighted-graph-and-an-adjacency-matrix-from-an-image-matrix, [retrieved from the internet on Nov. 27, 2023], 5 pages.
International Search Report and Written Opinion for International Application No. PCT/US2024/057403, mailed Mar. 13, 2025, 10 Pages.

* cited by examiner

500

| | Excursion detection model 1 | Excursion detection model 2 | Excursion detection model 3 |
|---|---|---|---|
| 510 | - | - | - |
| 520 | - | 2 | 3 |
| 530 | 1 | 9 | 20 |
| 540 | - | - | - |
| 550 | 5 | 8 | 15 |

600A

EXCURSION SCREENING MODELS FOR IMPROVING ACCURACY OF EXCURSION DETECTION WITHIN MANUFACTURING SYSTEMS

TECHNICAL FIELD

The present disclosure relates to manufacturing systems, and, more particularly, to implementing excursion screening models for improving accuracy of excursion detection within manufacturing systems.

BACKGROUND

Manufacturing of modern materials often involves various deposition techniques, such as chemical vapor deposition (CVD) or physical vapor deposition (PVD) techniques, in which atoms or molecules of one or more selected types are deposited on a semiconductor device (e.g., a substrate) held in low or high vacuum environments that are provided by vacuum processing (e.g., deposition, etching, etc.) chambers. Materials manufactured in this manner can include monocrystals, semiconductor films, fine coatings, and numerous other substances used in practical applications, such as electronic device manufacturing. Many of these applications depend on the purity and specifications of the materials grown in the processing chambers. The quality of such materials, in turn, depends on adherence of the manufacturing operations to correct process specifications. To maintain isolation of the inter-chamber environment and to minimize exposure of substrates to ambient atmosphere and contaminants, various sensor detection techniques are used to monitor processing chamber environment, substrate transportation, physical and chemical properties of the products, and the like to detect potential anomalies and issues.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes identifying at least one excursion corresponding to sensor data obtained from a manufacturing system, initiating an excursion screening process to screen the at least one excursion using an excursion screening model, wherein the excursion screening model is trained to classify the at least one excursion, and causing a screening output resulting from the screening process to be displayed on a user device.

In another aspect of the disclosure, a method includes obtaining sensor data from a set of sensors of a manufacturing system, initiating excursion detection using one or more excursion detection models, determining whether at least one excursion is detected by the one or more excursion detection models, and in response to determining that at least one excursion is detected by the one or more excursion detection models, training an excursion screening model to classify the at least one excursion based on the at least one excursion, wherein the excursion screening model is independent of the one or more excursion detection models.

A further aspect of the disclosure includes a system according to any aspect or embodiment described herein.

A further aspect of the disclosure includes a non-transitory computer-readable storage medium comprising instructions that, when executed by a processing device operatively coupled to a memory, performs operations according to any aspect or embodiment described herein.

BRIEF DESCRIPTION OF THE DRAWINGS

The present disclosure is illustrated by way of example, and not by way of limitation in the figures of the accompanying drawings.

DETAILED DESCRIPTION

Figure 1:
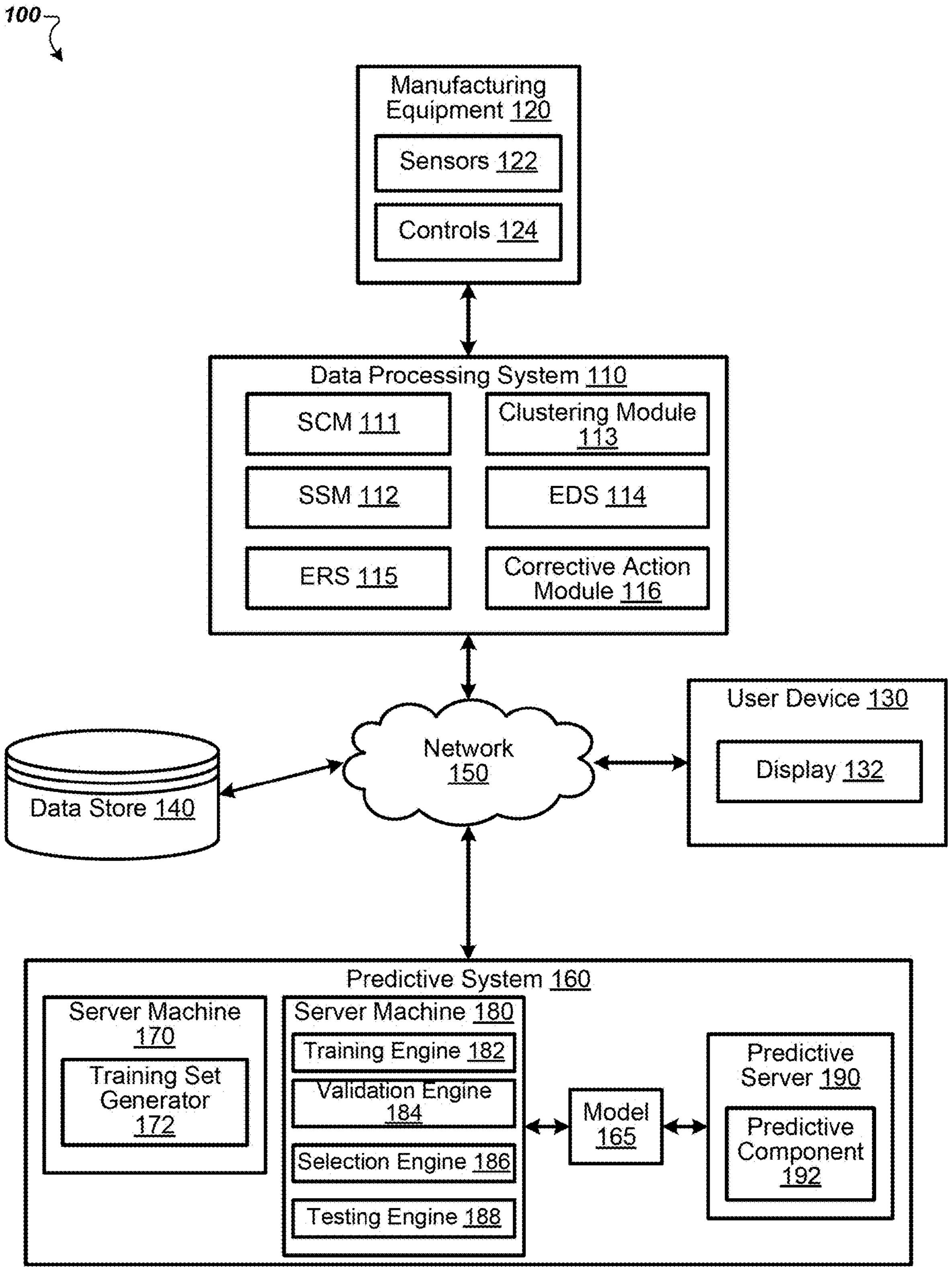
FIG. 1 is a block diagram illustrating an example system architecture, in accordance with some implementations of the present disclosure.

Described herein are technologies directed to implementing excursion screening models for improving accuracy of excursion detection within manufacturing systems. A manufacturing system can include manufacturing equipment. One example of manufacturing equipment is electronic device (e.g., semiconductor device) manufacturing equipment. For example, electronic device manufacturing equipment can include a process chamber that can perform at least one process on a substrate (e.g., wafer) according to a process recipe (e.g., a deposition process, a etch process, a polishing process, and/or a clean process). A process recipe defines a particular set of operations to be performed on a substrate during the process and can include one or more settings associated with each operation. For example, a deposition process recipe can include a temperature setting for the process chamber, a pressure setting for the process chamber, a flow rate setting for a precursor for a material included in the film deposited on the substrate surface, etc. Typical electronic device manufacturing processes often require tens or hundreds of steps, e.g., introducing a gas into a processing chamber, heating the chamber environment, changing a composition of gas, purging a chamber, pumping the gas out, changing pressure, moving a substrate from one position to another, creating or adjusting a plasma environment, performing etching or deposition steps, and so on.

Manufacturing equipment can have multiple sensors of the same (or similar) type distributed throughout various parts of the system. Such sensors can include temperature sensors, pressure sensors, chemical sensors, gas flow sensors, motion sensors, position sensor, optical sensors, etc. For each step of the process recipe, sensors placed within the manufacturing equipment can generate raw sensor data related to these and other settings (e.g., measured temperature during each step, measured pressure during each step, etc.). For example, a single processing chamber can have multiple chemical sensors to detect concentration of chemical vapor at various locations within the processing chamber and can similarly have multiple temperature sensors to monitor a temperature distribution.

A processing device operatively coupled to the manufacturing equipment can process streams of run-time data from the various sensors placed inside the manufacturing equipment. Some or all of the sensors can output a constant stream of data. For example, a temperature sensor can output a temperature reading every second (or more frequently), so that the temperature sensor can generate hundreds of data points just from a single etch step that may take several minutes to perform. For example, the processing device operatively coupled to the manufacturing equipment can determine statistics representative of the sensor data. Examples of statistics include mean, median, mode, upper bound, lower bound, variance, standard deviation, skewness (third moment), kurtosis (fourth moment), etc. For each process run (e.g., the execution of a particular recipe on a substrate), these data items related to the execution of a recipe (e.g., the statistics data, the sensor data, contextual data such as recipe identifier, a recipe step number(s), etc.) can be collected and stored (referred to as a "process run dataset"). The data items can first be combined into multiple "arrays." An array can include a combination of data items according to a predefined format or pattern. Each array can include a particular sensor (e.g., chamber pressure sensor, heater current sensor, etc.), a statistic data type (e.g., mean, range, etc.), and a recipe portion identifier (e.g., step 1, step 11, entire recipe, etc.). For example, an array can be indicative of the average heater temperature during step 5 of a particular process recipe. Each sensor (alone or in combination with other sensors) can output data that is indicative of a sudden or gradual detrimental changes in the environment or in the settings of the manufacturing process.

An excursion detection system can process sensor data obtained from sensors of a manufacturing system to detect any excursions that exist within the manufacturing system. An excursion refers to an anomaly or fault detected within the manufacturing system based on the sensor data. An excursion detection system can utilize one or more excursion detection models designed to detect, based on the sensor data, the existence of any excursions within the manufacturing system. For example, an excursion detection model can include a trained machine learning model.

Various types of excursions can be detected from sensor data. One type of excursion is no excursion (i.e., the sensor data is normal). Another type of an excursion is a noise excursion. A noise excursion is an excursion caused by signal noise. Another type of an excursion is a spike excursion. Another type of an excursion is an offset excursion. Another type of an excursion is an exponential excursion. Another type of an excursion is an oscillation excursion.

An excursion detection system can utilize multiple excursion detection models (e.g., an excursion detection ensemble) for detecting any excursions that exist within a manufacturing system. Each of the excursion detection models can be independently tailored (e.g., trained) to perform a respective excursion detection task. Accordingly, multiple excursion detection tasks can be performed in using multiple excursion detection models (e.g., in parallel).

An excursion detection system can process large amounts of statistical data derived from raw sensor data obtained from multiple sensors within a manufacturing system. For example, an excursion of a manufacturing process can be indicative of deterioration of manufacturing yield. The excursion can be related to an issue in a sub-system of the manufacturing system, an issue in a particular component of the manufacturing system, etc. A sub-system can refer to a pressure sub-system, a flow sub-system, a temperature sub-system and so forth, each sub-system having one or more components. A component can include, for example, a pressure pump, a vacuum, a gas deliver line, etc.

Some excursions detected by an excursion detection system can be irrelevant excursions. Examples of irrelevant excursions include false positive excursions, unimportant excursions, etc. An excursion review system can use one or more excursion review techniques to review one or more excursions detected by one or more excursion detection models of an excursion detection system. Some excursion review techniques focus on false positives and true positives, while ignoring grey areas corresponding to human uncertainty. Moreover, implementing an excursion review technique within an excursion detection model can require changes to the excursion detection model itself. This can make the implementation of excursion review techniques intrusive and can prevent the scalability of excursion review in excursion detection systems that utilize multiple excursion detection models. Additionally, some excursion detection systems do not provide a complete flow of a model feedback lifecycle that considers feedback (e.g., human feedback).

Aspects and implementations of the present disclosure address these and other shortcomings of the existing technology by implementing excursion screening models for improving accuracy of excursion detection within manufacturing systems. An excursion detection system can include at least one processing device that uses one or more excursion detection models (e.g., multiple excursion detection models) to detect any excursions within a manufacturing system. An excursion review system can include at least one processing device that uses an excursion screening model that can receive, as input, a set of excursions detected by the excursion detection system, and screen out any irrelevant excursions from the set of excursions to generate a set of relevant excursions (if any relevant excursions are remaining).

In some implementations, an excursion screening model uses pattern matching to classify an excursion detected by an excursion detection system. The excursion screening model can be trained to perform pattern matching using any suitable training method. In some implementations, the excursion screening model is trained to perform pattern matching using at least one supervised learning technique. Examples of supervised learning techniques include few shot approaches, similarity search approaches, etc.

For example, using a few shot approach, sensor data (e.g., time series data) depicting a type of excursion (e.g., no excursion, noise excursion, spike excursion, offset excursion, exponential excursion or oscillation excursion) can be converted into a corresponding excursion image that can be used to train the excursion screening model (e.g., convolutional neural network (CNN) classification model). Further details regarding training the excursion screening model to perform pattern matching will be described herein below.

An irrelevant excursion is an excursion classified by the excursion screening model as being irrelevant. For example, an irrelevant excursion can be an excursion classified by the excursion screening model as being a false positive ("false positive excursion"), an excursion classified by the excursion screening model as being unimportant for consideration ("unimportant excursion"), etc. The set of relevant excursions can include an excursion classified by the excursion screening model as being indicative of an anomaly or a fault within the manufacturing system ("true excursion"). Additionally or alternatively, the set of relevant excursions can include an excursion that cannot be classified by the excursion screen model ("unknown excursion").

In some implementations, an excursion review system causes a set of excursions to be displayed on a user device via a user interface (e.g., graphical user interface (GUI)). The excursion review system can receive, via the user interface, a classification of an excursion of the set of excursions. For example, the classification can indicate that the excursion is a relevant excursion or an irrelevant excursion. The classification can be used as feedback data to train or re-train the excursion screening model to apply the classification to a similar excursion detected by the excursion detection system in the future. Accordingly, the feedback data can be used to improve the ability of the excursion screening model to detect irrelevant excursions. Accordingly, an excursion screening model can be trained to efficiently and automatically filter out irrelevant excursions detected by an excursion detection system, which can reduce the number of excursions that are subject to manual review.

Aspects of the present disclosure result in technological advantages of improving the accuracy of anomaly detection within manufacturing systems. For example, an excursion screening model of an excursion review system described herein can be separate and/or independent from each of the one or more excursion detection models of an excursion detection system. That is, an excursion screening model described herein can be agnostic to the excursion detection model(s) implemented by the excursion detection system. This can improve the scalability of excursion screening by, e.g., eliminating the need to rewrite and/or retrain individual excursion detection models to perform excursion review. As another example, an excursion screening model described herein can enable consideration of grey areas where humans are uncertain. Additionally, implementations described herein can reduce the number excursions sent to user devices for manual review, which can improve the performance of an excursion review system by reducing resource consumption (e.g., reducing processor, memory and/or network resource consumption). Accordingly, implementations described herein can increase excursion detection and review accuracy and computational efficiency, which can reduce fabrication of inconsistent and abnormal products by a manufacturing system, prevent unscheduled user time or down time, etc.

Various aspects of the above referenced methods and systems are described in further detail below by way of examples, rather than by way of limitation. The embodiments and examples provided below are discussed in relation to manufacturing systems. However, it is noted that aspects of the present disclosure, such as those relating to automatically grouping sensors to improve anomaly detection, can be applied to other fields and industries, such as pharmaceuticals.

FIG. 1 depicts an illustrative manufacturing system 100, according to aspects of the present disclosure. In some implementations, manufacturing system 100 is a system for processing substrates (e.g., wafers). For example, manufacturing system 100 can include a data processing system 110, manufacturing equipment 120, a user device 130, a data store 140, a network 150, and a predictive system 160.

The manufacturing equipment 120 can include sensors 122 configured to capture data for a substrate being processed at the manufacturing system. In some embodiments, the manufacturing equipment 120 and sensors 122 can be part of a sensor system that includes a sensor server (e.g., field service server (FSS) at a manufacturing facility) and sensor identifier reader (e.g., front opening unified pod (FOUP) radio frequency identification (RFID) reader for sensor system). In some embodiments, metrology equipment can be part of manufacturing system 100 that includes a metrology server (e.g., a metrology database, metrology folders, etc.) and metrology identifier reader (e.g., FOUP RFID reader for metrology system).

Manufacturing equipment 120 can produce products, such as electronic devices, following a recipe or performing runs over a period of time. Manufacturing equipment 120 can include a process chamber. Manufacturing equipment 120 can perform a process for a substrate (e.g., a wafer, etc.) at the process chamber. Examples of substrate processes include a deposition process to deposit one or more layers of film on a surface of the substrate, an etch process to form a pattern on the surface of the substrate, etc. Manufacturing equipment 120 can perform each process according to a process recipe. A process recipe defines a particular set of operations to be performed for the substrate during the process and can include one or more settings associated with each operation. For example, a deposition process recipe can include a temperature setting for the process chamber, a pressure setting for the process chamber, a flow rate setting for a precursor for a material included in the film deposited on the substrate surface, etc.

In some embodiments, manufacturing equipment 120 includes sensors 122 that are configured to generate data associated with a substrate processed at manufacturing system 100. For example, a process chamber can include one or more sensors configured to generate spectral or non-spectral data associated with the substrate before, during, and/or after a process (e.g., a deposition process, an etch process, etc.) is performed for the substrate. In some embodiments, spectral data generated by sensors 122 can indicate a concentration of one or more materials deposited on a surface of a substrate. Sensors 122 configured to generate spectral data associated with a substrate can include reflectometry sensors, ellipsometry sensors, thermal spectra sensors, capacitive sensors, and so forth. Sensors 122 configured to generate non-spectral data associated with a substrate can include temperature sensors, pressure sensors, flow rate sensors, voltage sensors, etc. For example, sensors 122 can include at least one of: a temperature sensor, a pressure sensor, a chemical detection sensor, a chemical composition sensor, a gas flow sensor, a motion sensor, a position sensor, an optical sensor, or any and other type of sensors. Some or all of the sensors 122 can include a light source to produce light (or any other electromagnetic radiation), direct it towards a target, such as a component of the machine 100 or a substrate, a film deposited on the substrate, etc., and detect light reflected from the target. The sensors 122 can be located anywhere inside the manufacturing equipment 120 (for example, within any of the chambers including the loading stations, on one or more robots, on a robot blade, between the chambers, and so one), or even outside the manufacturing equipment 120 (where the sensors can test ambient temperature, pressure, gas concentration, and so on).

In some embodiments, sensors 122 generate sensor data (e.g., sensor values, features, trace data) associated with manufacturing equipment 120 (e.g., associated with producing, by manufacturing equipment 120, corresponding products, such as substrates). The manufacturing equipment 120 can produce products following a recipe or by performing runs over a period of time. Sensor data received over a period of time (e.g., corresponding to at least part of a recipe or run) can be referred to as trace data (e.g., historical trace data, current trace data, etc.) received from different sensors 122 over time. Sensor data can include a value of one or more of temperature (e.g., heater temperature), spacing (SP), pressure, high frequency radio frequency (HFRF), voltage of electrostatic chuck (ESC), electrical current, material flow, power, voltage, etc. Sensor data can be associated with or indicative of manufacturing parameters such as hardware parameters, such as settings or components (e.g., size, type, etc.) of the manufacturing equipment 120, or process parameters of the manufacturing equipment 120. The sensor data can be provided while the manufacturing equipment 120 is performing manufacturing processes (e.g., equipment readings when processing products). The sensor data can be different for each substrate.

In some embodiments, manufacturing equipment 120 can include controls 124. Controls 124 can include one or more components or sub-systems configured to enable and/or control one or more processes of manufacturing equipment 120. For example, a sub-system can include a pressure sub-system, a flow sub-system, a temperature sub-system and so forth, each sub-system having one or more components. The component can include, for example, a pressure pump, a vacuum, a gas deliver line, a plasma etcher, actuators etc. In some embodiments, controls 124 can be managed based on data from sensors 122, input from control device 120, etc. Further details regarding manufacturing equipment 120 are provided with respect to FIG. 2.

In some implementations, the data processing system 110 includes a predictive system. The data processing system 110 can include at least one computing device. The data processing system 110 can include one or more computing devices. Examples of computing devices include servers, routers, personal computers, mainframe computers, laptops, tablets, mobile phones, network connected televisions, network-connected media players, set-top boxes, over-the-top (OTT) streaming devices, operator boxes, servers, graphics processing units (GPUs), application-specific integrated circuits (ASICs) etc.

The data processing system 110 can include a number of components, including a sensor control module (SCM) 111, a sensor statistics module (SSM) 112, a clustering module 113, an excursion detection system (EDS) 114, an excursion review system (ERS) 115, and a corrective action module 116. Components 111-116 can execute instructions to perform any one or more of the methodologies and/or embodiments described herein. The instructions can be stored on a computer readable storage medium, which can include the main memory, static memory, secondary storage and/or processing device (during execution of the instructions).

The SCM 111 can activate sensors 122, deactivate sensors 122, place sensors 122 in an idle state, change settings of the sensors 122, detect sensor hardware or software problems, and so on. In some implementations, the SCM 111 can keep track of the processing operations performed by the manufacturing equipment 120 and determine which sensors 122 to be sampled for a particular processing (or diagnostic, maintenance, etc.) operation of the manufacturing equipment 120. For example, during a chemical deposition step inside one of the processing chambers, the SCM 111 can sample sensors 122 that are located inside the respective processing chamber but not activate (or sample) sensors 122 located inside the transfer chamber and/or the loading station. The raw sensor data obtained by the SCM 111 can include time series data where a specific sensor 124 captures or generates one or more readings of a detected quantity at a series of times. For example, a pressure sensor can generate N pressure readings $P(t_i)$ at time instances $t_1$, $t_2$, . . . $t_N$. In some implementations, the raw sensor data obtained by the SCM 111 can include spatial maps at a pre-determined set of spatial locations. For example, an optical reflectivity sensor can determine reflectivity of a film deposited on the surface of a wafer, $R(x_j, y_i)$, at a set (e.g., a two-dimensional set) of spatial locations $x_j$, $y_k$, on the surface of the film/wafer. In some implementations, both the time series and the spatial maps raw sensor data can be collected. For example, as the film is being deposited on the wafer, the SCM 111 can collect the reflectivity data from various locations on the surface of the film and at a set of consecutive instances of time, $R(t_i,x_j,y_l)$.

SSM 112 can process raw sensor data obtained by the SCM 111 from the sensors 122 and determine statistics representative of the raw sensor data ("statistics data"). For example, for each or some of the raw sensor data distributions, the SSM 112 can determine one or more parameters of the distribution, such as a mean, a median, a mode, an upper bound, a lower bound, a variance (or a standard deviation), a skewness (third moment), a kurtosis (fourth moment), or any further moments or cumulants of the data distribution. In some implementations, the SSM 112 can model (e.g., via regression analysis fitting) the raw sensor data with various model distributions (normal distribution, log-normal distribution, binomial distribution, Poisson distribution, Gamma distribution, or any other distribution. In such implementations, the one or more parameters can include an identification of the fitting distribution being used together with the fitting parameters determined by the SSM 112. In some implementations, the SSM 112 can use multiple distributions to fit the raw sensor data from one sensor, e.g., a main distribution and a tail distribution for outlier data points. The parameters of the distributions obtained by the SSM 112 can be sensor-specific. For example, for some sensors a small number of parameters can be determined (mean, median, variance) whereas for some sensor many more (e.g., 10 or 20) moments can be determined.

Clustering module 113 can be configured to group, into one or more clusters, one or more data items related to the manufacturing process. In some embodiments, the data item can include sensor data, task data, contextual data, statistics data, etc. In some embodiments, the data items can first be combined into a set(s) of "arrays." An array can include a combination of data items according to a predefined format or pattern. In some embodiments, each array can include a particular sensor (e.g., chamber pressure sensor, heater current sensor, etc.), a statistic data type (e.g., mean, range, etc.), and a recipe portion identifier (e.g., step 1, step 11, entire recipe, etc.). For example, an array can be indicative of the average heater voltage during step 3 of a particular process recipe.

To group the data items or arrays into one or more clusters, the clustering module 113 can use one or more correlation methods capable of determining or inferring relationships between data items. In some embodiments, the correlation methods include Pearson correlation method (Pearson correlation coefficient), Kendall correlation method (Kendall rank correlation coefficient), Spearman's correlation method (Spearman's rank correlation coefficient), Quotient correlation method, the Phik correlation method, the SAX (Symbolic Aggregate approXimation) correlation method, or any other statistic method capable of determining a correlation between two sets of data. The Pearson correlation method can measure the strength of a linear correlation between two variables. In particular, Pearson correlation can be used to generate a coefficient indicative of a ratio between the covariance of two variables and the product of their standard deviation. Using the Pearson correlation method, clustering module 113 can assign a coefficient (e.g., a value) between −1 and 1, where 0 is no correlation, 1 is total positive correlation, and −1 is total negative correlation between the variables (or sets of data). For example, a correlation value of 0.7 between variables indicates that a significant and positive relationship exists. A positive correlation signifies that if variable A goes up, then B will also go up, whereas if the value of the correlation is negative, then if A increases, B decreases.

Kendall correlation method is a statistic used to measure the ordinal association between two measured quantities. In particular, Kendall correlation measures the strength and direction of association that exists between two variables. Spearman's correlation method is a nonparametric measure of rank correlation, e.g., the statistical dependence between the rankings of two variables. Spearman's correlation can assess how well the relationship between two variables can be described using a monotonic function. The Quotient correlation method is a sample based alternative to the Pearson correlation method that measures nonlinear dependence where the regular correlation coefficient is generally not applicable.

In some embodiments, clustering module 113 can use one or more machine learning models (e.g., model 165) to cluster data items into specific clusters. In particular, clustering module 113 can input data items into the machine learning model, and receive, as output, data indicative of clustering assignments (e.g., whether two data items should be clustered, which data items belong to which cluster, etc.) In some embodiments, the machine learning model can generate the output data using, for example, a K-means clustering algorithm, a density-based spatial clustering of applications with noise (DBSCAN) algorithm, a Spectral Clustering algorithm, a Ward clustering algorithm, a Birch clustering algorithm, or any other clustering algorithm. The machine learning model can be generated by the predictive system 310, which is discussed with regards to FIG. 3.

Based on a determined correlation between two data items or arrays, clustering module 113 can assign the data items or arrays to a particular cluster. In some embodiments, the clustering module 113 can determine a correlation value between two data items or arrays. In response to the correlation value satisfying a threshold criterion (e.g., being one or more of greater than, equal to, or less than a predetermine threshold value), clustering module 113 can assign the two data items or arrays to a particular cluster. For example, clustering module 113 can assign both data items to the next available cluster (e.g., cluster A, cluster 1, etc.). Clustering module 113 can continue to determine correlations between different data items. Responsive to a correlation value between an assigned data item (e.g., a data item assigned to cluster A) and an unassigned data item (a data item not assigned to a cluster) satisfying a threshold criterion, clustering module 113 can assign the unassigned data item to the same cluster as the assigned data item (e.g., assign the unassigned data item to cluster A). Responsive to a correlation value of two unassigned data items satisfying a threshold criterion, clustering module 113 can assigned both unassigned data items to a next unassigned cluster (e.g., cluster B. In some embodiments, data items that remain unassigned (e.g., those whose correlation value with all or a set of other data item failed to satisfy a threshold criterion) can remain unassigned or be assigned to a particular, predetermined cluster.

Data store 140 can be a memory (e.g., random access memory), a drive (e.g., a hard drive, a flash drive), a database system, or another type of component or device capable of storing data. Data store 140 can include multiple storage components (e.g., multiple drives or multiple databases) that can span multiple computing devices (e.g., multiple server computers). Data store 140 can store data associated with processing a substrate at manufacturing equipment 120. For example, data store 140 can store data collected by sensors 122 at manufacturing equipment 120 before, during, or after a substrate process (referred to as process data). Process data can refer to historical process data (e.g., process data generated for a prior substrate processed at the manufacturing system) and/or current process data (e.g., process data generated for a current substrate processed at the manufacturing system). Data store 140 can also store spectral data or non-spectral data associated with a portion of a substrate processed at manufacturing equipment 120. Spectral data can include historical spectral data and/or current spectral data.

Data store 140 can also store contextual data associated with one or more substrates processed at the manufacturing system. Contextual data can include a recipe name, recipe step number, preventive maintenance indicator, operator, etc. Contextual data can refer to historical contextual data (e.g., contextual data associated with a prior process performed for a prior substrate) and/or current process data (e.g., contextual data associated with current process or a future process to be performed for a prior substrate). The contextual data can further include identify sensors that are associated with a particular sub-system of a process chamber.

Data store 140 can also store task data. Task data can include one or more sets of operations to be performed for the substrate during a deposition process and can include one or more settings associated with each operation. For example, task data for a deposition process can include a temperature setting for a process chamber, a pressure setting for a process chamber, a flow rate setting for a precursor for a material of a film deposited on a substrate, etc. In another example, task data can include controlling pressure at a defined pressure point for the flow value. Task data can refer to historical task data (e.g., task data associated with a prior process performed for a prior substrate) and/or current task data (e.g., task data associated with current process or a future process to be performed for a substrate).

Data store 140 can also store statistics data. Statistics data can include statistics representative of the raw sensor data, generated by SSM 112, e.g., mean data (average), range data, standard deviation data, maximum and minimum data, median data, mode data, etc. Mean data can include a measured averages of two or more values. For example, mean data can be used to determine the average heater temperature, the process chamber pressure, the average flowrate of a gas, etc., during a step(s), a specific time duration, an entire process recipe, etc. Range data can include the middle observation in a set of data (e.g., a median temperature during a step). Range data can include the difference between a maximum value and a minimum value of a set of values (e.g. the range of the heater pressure during a process recipe). The standard deviation is measure of the amount of variation or dispersion of a set of values.

In some embodiments, data store 140 can store sensor cluster data. Sensor cluster data can include data identifying to which cluster a sensor (or array) is assigned. For example, a first set of sensors or arrays can be assigned (by clustering module 113) to cluster A, a second set of sensors or arrays can be assigned to cluster B, etc. In some embodiments, the sensor cluster data can include metadata that is related to each particular sensor or array. In some embodiments, the sensor cluster data can include a data structure, such as a data table, which stores records, where each record include a sensor identifier or array and a cluster identifier.

In some implementations, data store 140 stores data that is not accessible to a user of the manufacturing system. For example, process data, spectral data, contextual data, etc. obtained for a substrate being processed at the manufacturing system is not accessible to a user (e.g., an operator) of the manufacturing system. In some embodiments, all data stored at data store 140 can be inaccessible by the user of the manufacturing system. In other or similar embodiments, a portion of data stored at data store 140 can be inaccessible by the user while another portion of data stored at data store 140 can be accessible by the user. In some embodiments, one or more portions of data stored at data store 140 can be encrypted using an encryption mechanism that is unknown to the user (e.g., data is encrypted using a private encryption key). In other or similar embodiments, data store 140 can include multiple data stores where data that is inaccessible to the user is stored in one or more first data stores and data that is accessible to the user is stored in one or more second data stores.

In some implementations, data store 140 stores data associated with known excursion (e.g., fault) patterns. An excursion pattern can be a one or more values (e.g., a vector, a scalar, etc.) associated with one or more issues or failures associated with a process chamber sub-system. In some implementations, a fault pattern can be associated with a corrective action. For example, a fault pattern can include parameter adjustment steps to correct the issue or failure indicated by the fault pattern. For example, the predictive system or the corrective action module can compare a determined fault pattern (determined from data obtained from of one or more sensors of a sensor cluster) to a library of known fault patterns to determine the type of failure experienced by a sub-system, the cause of the failure, the recommended corrective action to correct the fault, and so forth.

Components 110-140 can be coupled to each other via a network 150. In some embodiments, network 150 is a public network. In some embodiments, network 150 is a private network. Network 150 can include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

In embodiments, a "user" can be represented as a single individual. However, other embodiments of the disclosure encompass a "user" being an entity controlled by a plurality of users and/or an automated source. For example, a set of individual users federated as a group of administrators can be considered a "user."

In some embodiments, predictive system 160 can use at least one machine learning model ("model") 165 to group two or more sensor based on, for example, sensor statistics data. For example, model 165 can receive sensor statistics data as input, and generate, as output, sensor cluster data. In some embodiments, predictive system 160 can include server machine 170, server machine 180, and predictive server 190. Components 170-190 can each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

Server machine 170 can include a training set generator 172 that is capable of generating training data sets (e.g., a set of data inputs and a set of target outputs) to train, validate, and/or test a model 165. Model 165 can be any algorithmic model capable of learning from data. In some embodiments, model 165 can be a predictive model. In some embodiments, the training set generator 172 can partition the training data into a training set, a validating set, and a testing set, which can be stored, as part of the training statistics 172, in data store 140. Training statistics 172 which can be accessible to the computing device predictive system 160 directly or via network 130. In some embodiments, the predictive system 160 generates multiple sets of training data.

Server machine 180 can include a training engine 182, a validation engine 184, a selection engine 186, and/or a testing engine 188. An engine can refer to hardware (e.g., circuitry, dedicated logic, programmable logic, microcode, processing device, etc.), software (such as instructions run on a processing device, a general purpose computer system, or a dedicated machine), firmware, microcode, or a combination thereof. Training engine 182 can be capable of training one or more model 165. Model 165 can refer to the model artifact that is created by the training engine 182 using the training data (also referred to herein as a training set) that includes training inputs and corresponding target outputs (correct answers for respective training inputs). The training engine 182 can find patterns in the training data that map the training input to the target output (the answer to be predicted), and train the model 165 using these patterns. The model 165 can use one or more of a statistical modelling, support vector machine (SVM), Radial Basis Function (RBF), clustering, supervised machine-learning, semi-supervised machine-learning, unsupervised machine-learning, k-nearest neighbor algorithm (k-NN), linear regression, random forest, neural network (e.g., artificial neural network), etc.

One type of machine learning model that can be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities can be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks can learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In a plasma process tuning, for example, the raw input can be process result profiles (e.g., thickness profiles indicative of one or more thickness values across a surface of a substrate); the second layer can compose feature data associated with a status of one or more zones of controlled elements of a plasma process system (e.g., orientation of zones, plasma exposure duration, etc.); the third layer can include a starting recipe (e.g., a recipe used as a starting point for determining an updated process recipe the process a substrate to generate a process result the meets threshold criteria). Notably, a deep learning process can learn which features to optimally place in which level on its own. The “deep” in “deep learning” refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs can be that of the network and can be the number of hidden layers plus one. For recurrent neural networks, in which a signal can propagate through a layer more than once, the CAP depth is potentially unlimited.

In one embodiment, model 165 is a recurrent neural network (RNN). An RNN is a type of neural network that includes a memory to enable the neural network to capture temporal dependencies. An RNN is able to learn input-output mappings that depend on both a current input and past inputs. The RNN will address past and future flow rate measurements and make predictions based on this continuous metrology information. RNNs can be trained using a training dataset to generate a fixed number of outputs (e.g., to determine a set of substrate processing rates, determine modification to a substrate process recipe). One type of RNN that can be used is a long short term memory (LSTM) neural network.

Training of a neural network can be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset.

A training dataset containing hundreds, thousands, tens of thousands, hundreds of thousands or more sensor data and/or process result data (e.g., metrology data such as one or more thickness profiles associated with the sensor data) can be used to form a training dataset.

To effectuate training, processing logic can input the training dataset(s) into one or more untrained machine learning models. Prior to inputting a first input into a machine learning model, the machine learning model can be initialized. Processing logic trains the untrained machine learning model(s) based on the training dataset(s) to generate one or more trained machine learning models that perform various operations as set forth above. Training can be performed by inputting one or more of the sensor data into the machine learning model one at a time.

The model 165 can process the input to generate an output. An artificial neural network includes an input layer that consists of values in a data point. The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer can be another hidden layer or an output layer. In either case, the nodes at the next layer receive the output values from the nodes at the previous layer, and each node applies weights to those values and then generates its own output value. This can be performed at each layer. A final layer is the output layer, where there is one node for each class, prediction and/or output that the machine learning model can produce.

Accordingly, the output can include one or more predictions or inferences. For example, an output prediction or inference can include one or more predictions of film buildup on chamber components, erosion of chamber components, predicted failure of chamber components, and so on. Processing logic determines an error (i.e., a classification error) based on the differences between the output (e.g., predictions or inferences) of the machine learning model and target labels associated with the input training data. Processing logic adjusts weights of one or more nodes in the machine learning model based on the error. An error term or delta can be determined for each node in the artificial neural network. Based on this error, the artificial neural network adjusts one or more of its parameters for one or more of its nodes (the weights for one or more inputs of a node). Parameters can be updated in a back propagation manner, such that nodes at a highest layer are updated first, followed by nodes at a next layer, and so on. An artificial neural network contains multiple layers of “neurons”, where each layer receives as input values from neurons at a previous layer. The parameters for each neuron include weights associated with the values that are received from each of the neurons at a previous layer. Accordingly, adjusting the parameters can include adjusting the weights assigned to each of the inputs for one or more neurons at one or more layers in the artificial neural network.

After one or more rounds of training, processing logic can determine whether a stopping criterion has been met. A stopping criterion can be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy can be, for example, 70%, 80% or 90% accuracy. In one embodiment, the stopping criterion is met if accuracy of the machine learning model has stopped improving. If the stopping criterion has not been met, further training is performed. If the stopping criterion has been met, training can be complete. Once the machine learning model is trained, a reserved portion of the training dataset can be used to test the model.

Once one or more trained machine learning models 165 are generated, they can be stored in predictive server 190 as predictive component 192 or as a component of predictive component 192.

The validation engine 184 can be capable of validating model 165 using a corresponding set of features of a validation set from training set generator 172. Once the model parameters have been optimized, model validation can be performed to determine whether the model has improved and to determine a current accuracy of the deep learning model. The validation engine 184 can determine an accuracy of model 165 based on the corresponding sets of features of the validation set. The validation engine 184 can discard a trained model 165 that has an accuracy that does not meet a threshold accuracy. In some embodiments, the selection engine 186 can be capable of selecting a trained model 165 that has an accuracy that meets a threshold accuracy. In some embodiments, the selection engine 186 can be capable of selecting the trained model 165 that has the highest accuracy of the trained models 165. The testing engine 188 can be capable of testing a trained model 165 using a corresponding set of features of a testing set from data set generator 172. For example, a first trained model 165 that was trained using a first set of features of the training set can be tested using the first set of features of the testing set. The testing engine 188 can determine a trained model 165 that has the highest accuracy of all of the trained models based on the testing sets.

Predictive component 192 can provide data indicative of sensor clustering, and running trained model 165 on data items such as sensor data, statistics data, arrays, etc. input to obtain one or more outputs. The predictive component 192 can further provide sensor cluster data and/or anomaly detection data. This will be explained in further detail below.

It should be noted that in some other implementations, the functions of components 170-190 can be provided by a fewer number of machines. For example, in some embodiments, one or more of components 170-190 can be integrated into a single machine. Additionally, functions described as being performed by server machine 150, server machine 180, and/or predictive server 190 can also be performed in data processing system 110. In addition, the functionality attributed to a particular component can be performed by different or multiple components operating together.

In some embodiments, a manufacturing system can include multiple types of manufacturing equipment (e.g., process chambers). It should be noted that, in some embodiments, data obtained to train the model 165 and data collected to be provided as input to the model can be associated with the same manufacturing equipment of the manufacturing system. In other or similar embodiments, data obtained to train the model 165 and data collected to be provided as input to the model can be associated with different types of manufacturing equipment. In other or similar embodiments, data obtained to train the model 165 can be associated with manufacturing equipment of a first manufacturing system and data collected to be provide as input to the model can be associated with manufacturing equipment of a second manufacturing system.

EDS 114 can include at least one processing device utilize one or more excursion detection models designed to detect, based on the sensor data, the existence of any excursions within system 100. For example, the input to the EDS 114 can include trace data. In some implementations, EDS 114 processes raw sensor data obtained from sensors 122 to generate a set of sensor statistics, and detect excursions based on the set of sensor statistics. Processing the raw sensor data can include obtaining base sensor statistics, and reducing the dimensionality of the base sensor statistics to generate the set of sensor statistics.

The one or more excursion detection models can include one or more trained machine learning models to implement one or more excursion detection techniques. For example, a trained machine learning model can include a trained neural network. Examples of excursion detection techniques include Z-score, Tukey's range test, Grubb's test, feature bagging techniques, score normalization techniques, fuzzy logic-based outlier detection techniques, Bayesian networks, hidden Markov models (HMMs), Fourier transform method, a trace analysis method that generates adaptive "guard-bands" on certain sensors, etc. In some implementations, EDS 114 utilizes multiple excursion detection models (e.g., an excursion detection ensemble) for detecting any excursions that exist within a manufacturing system. The excursion detection models can be independently tailored (e.g., trained) to perform a respective excursion detection task. Accordingly, multiple excursion detection tasks can be performed in parallel using multiple excursion detection models.

EDS 114 can process large amounts of statistical data derived from raw sensor data obtained from multiple sensors within a manufacturing system. For example, an excursion of a manufacturing process can be indicative of deterioration of manufacturing yield. The excursion can be related to an issue in a sub-system of system 100, an issue in a particular component of system 100, etc. A sub-system can refer to a pressure sub-system, a flow sub-system, a temperature sub-system and so forth, each sub-system having one or more components. A component can include, for example, a pressure pump, a vacuum, a gas deliver line, etc.

Some excursions detected by EDS 114 can be irrelevant excursions. Examples of irrelevant excursions include false positive excursions, unimportant excursions, etc. In some implementations, ERS 115 include at least one processing device to use one or more excursion review techniques to review one or more excursions detected by EDS 114. For example, ERS 115 can use an excursion screening model that can receive, as input, a set of excursions detected by EDS 114, and screen out any irrelevant excursions from the set of excursions to generate a set of relevant excursions (if any relevant excursions are remaining).

An irrelevant excursion is an excursion classified by the excursion screening model as being irrelevant. For example, an irrelevant excursion can be an excursion classified by the excursion screening model as being a false positive ("false positive excursion"), an excursion classified by the excursion screening model as being unimportant for consideration ("unimportant excursion"), etc. The set of relevant excursions can include an excursion classified by the excursion screening model as being indicative of an anomaly or a fault within the manufacturing system ("true excursion"). Additionally or alternatively, the set of relevant excursions can include an excursion that cannot be classified by the excursion screen model ("unknown excursion").

In some implementations, an excursion screening model uses pattern matching to classify an excursion detected by an excursion detection system. The excursion screening model can be trained to perform pattern matching using any suitable training method. In some implementations, the excursion screening model is trained to perform pattern matching using at least one supervised learning technique. Examples of supervised learning techniques include few shot, a similarity search, etc. Further details regarding training the excursion screening model to perform pattern matching, including supervised learning techniques, will be described in further detail below with reference to FIGS. X.

In some implementations, the ERS 115 causes a set of excursions to be displayed on the user device 130 as a UI (e.g., GUI) via the display 132. The ERS 115 can receive, via the UI, a classification of an excursion of the set of excursions. For example, the classification can indicate that the excursion is a relevant excursion or an irrelevant excursion. The classification can be used as feedback data to train or re-train the excursion screening model to apply the classification to a similar excursion detected by the excursion detection system in the future. Accordingly, the feedback data can be used to improve the ability of the excursion screening model to detect irrelevant excursions. Accordingly, an excursion screening model can be trained to efficiently and automatically filter out irrelevant excursions detected by an excursion detection system, which can reduce the number of excursions that are subject to manual review. Further details regarding the operations of the ERS 115 will be described below with reference to FIGS. X.

Corrective action module 116 can receive input data of an indication associated with manufacturing equipment 120, determine one or more corrective actions to be performed based on the input data, and cause the one or more corrective actions to be performed. For example, responsive to receiving an indication that sensor data relating to each sensor of a sensor cluster satisfies a threshold criterion (e.g., exceeded or fell below a threshold value), the correction action module 116 can perform the one or more corrective actions. Examples of corrective actions can include increase power, decrease flowrate, etc. Corrective actions can be stored in an excursion pattern library on data store 140. In some embodiments, the corrective action module 116 receives an indication of a corrective action from the predictive system 310 and causes the corrective action to be implemented. User device 130 can enable users to generate, view and/or edit data (e.g., indication associated with manufacturing equipment 120, corrective actions associated with manufacturing equipment 120, etc.).

Figure 2:
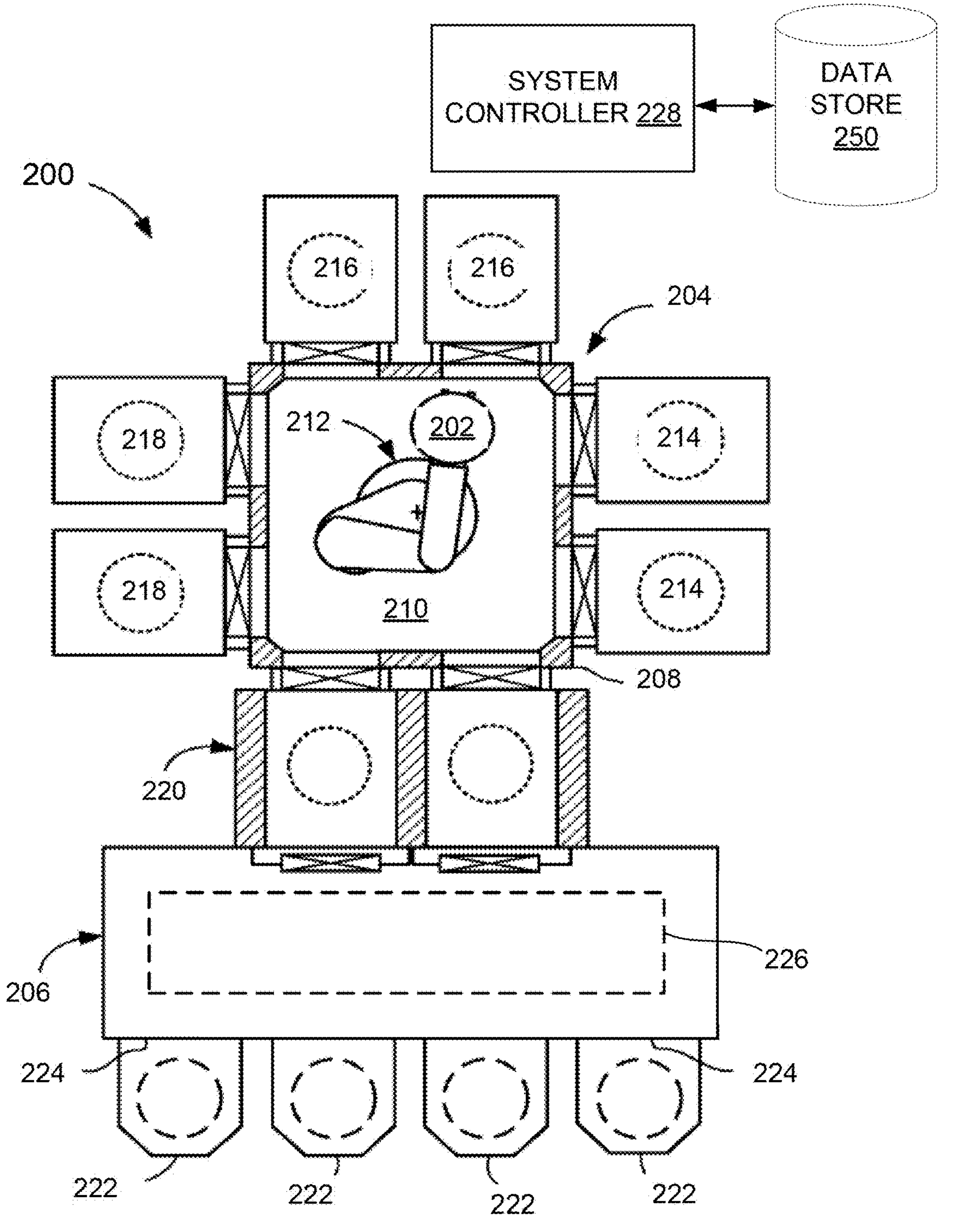
FIG. 2 is a top schematic view of an example manufacturing system, in accordance with some implementations of the present disclosure.

FIG. 2 is a top schematic view of an example manufacturing system 200, according to aspects of the present disclosure. Manufacturing system 200 can perform one or more processes on a substrate 202. Substrate 202 can be any suitably rigid, fixed-dimension, planar article, such as, e.g., a silicon-containing disc or wafer, a patterned wafer, a glass plate, or the like, suitable for fabricating electronic devices or circuit components thereon.

Manufacturing system 200 can include a processing tool 204 and a factory interface 206 coupled to processing tool 204. Processing tool 204 can include a housing 208 having a transfer chamber 210 therein. Transfer chamber 210 can include one or more process chambers (also referred to as processing chambers) 214, 216, 218 disposed therearound and coupled thereto. Process chambers 214, 216, 218 can be coupled to transfer chamber 210 through respective ports, such as slit valves or the like. Transfer chamber 210 can also include a transfer chamber robot 212 configured to transfer substrate 202 between process chambers 214, 216, 218, load lock 220, etc. Transfer chamber robot 212 can include one or multiple arms where each arm includes one or more end effectors at the end of each arm. The end effector can be configured to handle particular objects, such as wafers, sensor discs, sensor tools, etc.

Process chambers 214, 216, 218 can be adapted to carry out any number of processes on substrates 202. A same or different substrate process can take place in each processing chamber 214, 216, 218. A substrate process can include atomic layer deposition (ALD), physical vapor deposition (PVD), chemical vapor deposition (CVD), etching, annealing, curing, pre-cleaning, metal or metal oxide removal, or the like. Other processes can be carried out on substrates therein. Process chambers 214, 216, 218 can each include one or more sensors configured to capture data for substrate 202 before, after, or during a substrate process. For example, the one or more sensors can be configured to capture spectral data and/or non-spectral data for a portion of substrate 202 during a substrate process. In other or similar embodiments, the one or more sensors can be configured to capture data associated with the environment within process chamber 214, 216, 218 before, after, or during the substrate process. For example, the one or more sensors can be configured to capture data associated with a temperature, a pressure, a gas concentration, etc. of the environment within process chamber 214, 216, 218 during the substrate process.

In some embodiments, metrology equipment (not shown) can be located within the processing tool. In other embodiments, metrology equipment (not shown) can be located within one or more process chambers 214, 216, 218. In some embodiments, the substrate can be placed onto metrology equipment using transfer chamber robot 212. In other embodiments, the metrology equipment can be part of the substrate support assembly (not shown). Metrology equipment can provide metrology data associated with substrates processed by manufacturing equipment 120. The metrology data can include a value of film property data (e.g., wafer spatial film properties), dimensions (e.g., thickness, height, etc.), dielectric constant, dopant concentration, density, defects, etc. In some embodiments, the metrology data can further include a value of one or more surface profile property data (e.g., an etch rate, an etch rate uniformity, a critical dimension of one or more features included on a surface of the substrate, a critical dimension uniformity across the surface of the substrate, an edge placement error, etc.). The metrology data can be of a finished or semi-finished product. The metrology data can be different for each substrate. Metrology data can be generated using, for example, reflectometry techniques, ellipsometry techniques, TEM techniques, and so forth.

A load lock 220 can also be coupled to housing 208 and transfer chamber 210. Load lock 220 can be configured to interface with, and be coupled to, transfer chamber 210 on one side and factory interface 206. Load lock 220 can have an environmentally-controlled atmosphere that can be changed from a vacuum environment (wherein substrates can be transferred to and from transfer chamber 210) to an at or near atmospheric-pressure inert-gas environment (wherein substrates can be transferred to and from factory interface 206) in some embodiments. Factory interface 206 can be any suitable enclosure, such as, e.g., an Equipment Front End Module (EFEM). Factory interface 206 can be configured to receive substrates 202 from substrate carriers 222 (e.g., Front Opening Unified Pods (FOUPs)) docked at various load ports 224 of factory interface 206. A factory interface robot 226 (shown dotted) can be configured to transfer substrates 202 between carriers (also referred to as containers) 222 and load lock 220. Carriers 222 can be a substrate storage carrier or a replacement part storage carrier.

Manufacturing system 200 can also be connected to a client device (e.g., client device 110, not shown) that is configured to provide information regarding manufacturing system 200 to a user (e.g., an operator). In some embodiments, the client device can provide information to a user of manufacturing system 200 via one or more graphical user interfaces (GUIs). For example, the client device can provide information regarding a target thickness profile for a film to be deposited on a surface of a substrate 202 during a deposition process performed at a process chamber 214, 216, 218 via a GUI. The client device can also provide information regarding anomaly detection and fault classification, in accordance with embodiments described herein.

Manufacturing system 200 can also include a system controller 228. System controller 228 can be and/or include a computing device such as a personal computer, a server computer, a programmable logic controller (PLC), a microcontroller, and so on. System controller 228 can include one or more processing devices, which can be general-purpose processing devices such as a microprocessor, central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device can also be one or more special-purpose processing devices such as an application specific integrated circuit (ASIC), a field programmable gate array (FPGA), a digital signal processor (DSP), network processor, or the like. System controller 228 can include a data storage device (e.g., one or more disk drives and/or solid state drives), a main memory, a static memory, a network interface, and/or other components. System controller 228 can execute instructions to perform any one or more of the methodologies and/or embodiments described herein. In some embodiments, system controller 228 can execute instructions to perform one or more operations at manufacturing system 200 in accordance with a process recipe. The instructions can be stored on a computer readable storage medium, which can include the main memory, static memory, secondary storage and/or processing device (during execution of the instructions).

System controller 228 can receive data from sensors (e.g., sensors 122, now shown) included on or within various portions of manufacturing system 200 (e.g., processing chambers 214, 216, 218, transfer chamber 210, load lock 220, etc.). In some embodiments, data received by the system controller 228 can include spectral data and/or non-spectral data for a portion of substrate 202. In other or similar embodiments, data received by the system controller 228 can include data associated with processing substrate 202 at processing chamber 214, 216, 218, as described previously. For purposes of the present description, system controller 228 is described as receiving data from sensors included within process chambers 214, 216, 218. However, system controller 228 can receive data from any portion of manufacturing system 200 and can use data received from the portion in accordance with embodiments described herein. In an illustrative example, system controller 228 can receive data from one or more sensors for process chamber 214, 216, 218 before, after, or during a substrate process at the process chamber 214, 216, 218. Data received from sensors of the various portions of manufacturing system 200 can be stored in a data store 250. Data store 250 can be included as a component within system controller 228 or can be a separate component from system controller 228. In some embodiments, data store 250 can be data store 140 described with respect to FIG. 1.

Figure 3:
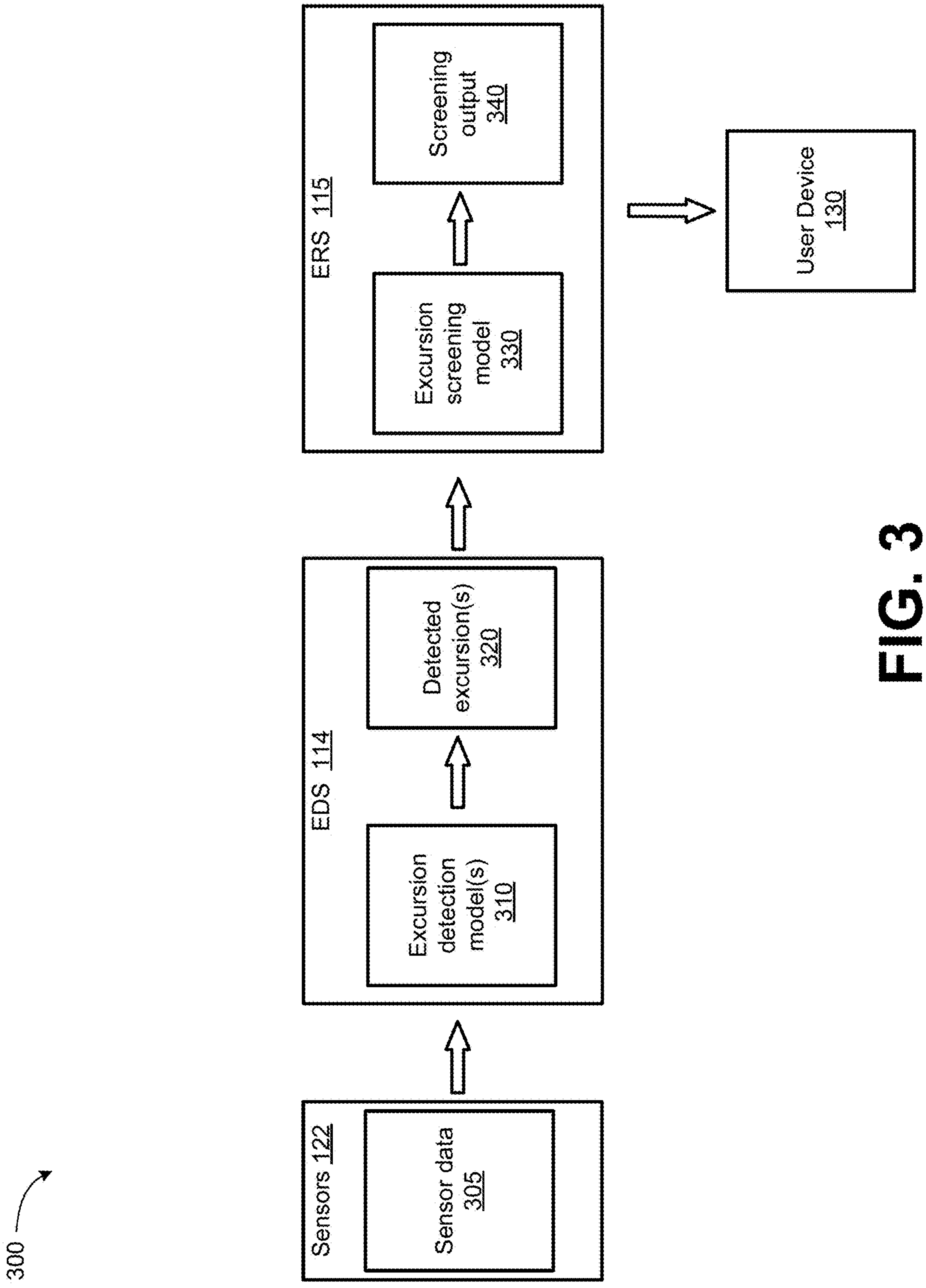
FIG. 3 is a diagram illustrating an example system/method for using an excursion screening model to screen excursions, in accordance with some implementations of the present disclosure.

FIG. 3 is a diagram 300 illustrating an example system/method for using an excursion screening model to screen excursions, in accordance with some implementations of the present disclosure. As shown, sensors 122 (e.g., as described in further detail above with reference to FIG. 1) can generate sensor data 305 (e.g., sensor statistics). In some implementations, the sensor data 305 includes trace data.

One or more excursion detection models 310 of EDS 114 (e.g., as described in further detail above with reference to FIG. 1) can be used to detect the existence of any excursions from the sensor data 305. In some implementations, the excursion detection model(s) 310 include a plurality of excursion detection models (e.g., as described in further detail above with reference to FIG. 1). Each excursion detection model of the plurality of excursion detection models 310 can be independently tailored (e.g., trained) to perform a respective excursion detection task. Accordingly, if the excursion detection model(s) 310 include a plurality of excursion detection models, then a plurality of excursion detection tasks can be performed in parallel using the plurality of excursion detection models 310.

In this illustrative example, one or more detected excursions 320 have been detected from the sensor data 305 using the excursion detection model(s) 310. An excursion screening model 330 of ERS 115 (e.g., as described in further detail above with reference to FIG. 1) can be used to screen the detected excursion(s) 320 to generate screening output 340. The excursion screening model 330 can be a machine learning model that is trained to identify relevant excursions and/or irrelevant excursions. In some implementations, the excursion screening model 330 uses pattern matching to classify each of the detected excursion(s) 320 to generate the screening output 340. The excursion screening model 330 can be trained using any suitable training method. Further details regarding training the excursion screening model 330 to classify each of the detected excursion(s) 320 (e.g., using a supervised learning technique) are described above with reference to FIG. 1 and will be described in further detail below with reference to FIGS. 4 and 7A-9A.

More specifically, the excursion screening model 330 can be used to identify relevant and/or irrelevant excursions exist within the detected excursion(s) 320. For example, an irrelevant excursion can be an excursion classified by the excursion screening model 330 as being a false positive excursion, an unimportant excursion, etc., as described in further detail above with reference to FIG. 1. A relevant excursion can be an excursion classified by the excursion screening model 330 as a true excursion, or an unknown excursion that may necessitate further review, as described in further detail above with reference to FIG. 1.

The screening output 340 can then be sent to at least one user device 130 (e.g., as described above with reference to FIG. 1). For example, the screening output 340 can be displayed on a user interface (e.g., GUI) to enable user review. In some implementations, any irrelevant excursions determined to exist within the detected excursion(s) 320 can also be sent to the at least one user device 130. For example, the irrelevant excursion(s) can also be viewable on the user interface in case a user would like to review the irrelevant excursion(s) (e.g., manually confirm that an irrelevant excursion is indeed irrelevant. Such user feedback can be used to further refine the excursion screening model 330.

In some implementations, at least one processing device can cause an excursion review dashboard to be displayed on the at least one user device 130. The excursion review dashboard can display a number of visualizations of excursions that can be viewed by at least one user for excursion assessment. In some implementations, the excursion review dashboard can display an overview of the screening output 340. For example, the overview can indicate, for each manufacturing equipment (e.g., processing tool) of a set of manufacturing equipment, a number of reviewable excursions. If multiple excursion detection models are used, then the overview can, for each excursion detection model, indicate the number of reviewable excursions. For example, as will be discussed herein below, the number of reviewable excursions can indicate a number of excursions that have been placed on a watch list of a set of lists of the excursion review dashboard. If there are no reviewable excursions, this means that any excursions may have been placed on an ignore list or a false alarm list of the set of lists. In some implementations, any current and future excursions determined to be similar to an excursion assigned to a particular classification (e.g., watch, ignore, fault or false alarm) can be automatically assigned to the particular list. An illustrative example of the overview will now be described below with reference to FIG. 5.

Figures 5, 6A:
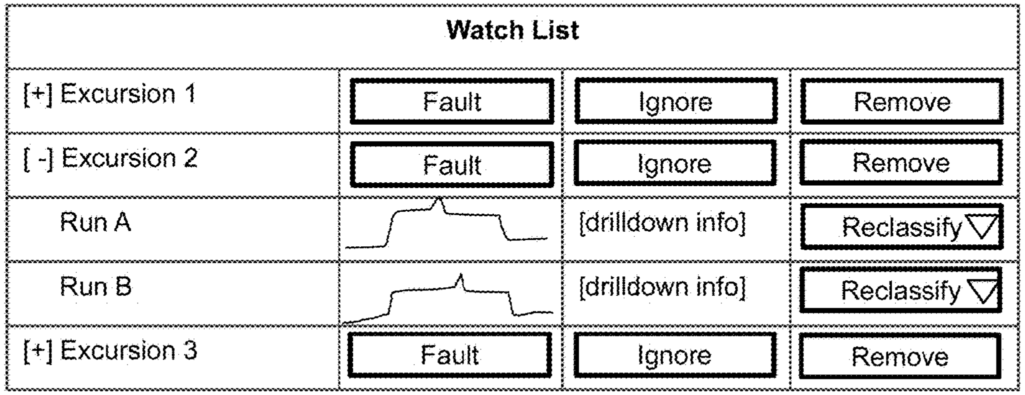
FIG. 5 is a chart illustrating an example visualization of excursions detected by multiple excursion detection models, in accordance with some implementations of the present disclosure.
FIG. 6A-6C are charts illustrating example visualizations of excursion classifications, in accordance with some implementations of the present disclosure.

FIG. 5 is an example chart 500 illustrating an example visualization of excursions detected by multiple excursion detection models, in accordance with some implementations of the present disclosure. The chart 500 includes rows 510-550, where each row corresponds to respective manufacturing equipment (e.g., processing tool) of a manufacturing system. Each column corresponds a respective excursion detection model (e.g., "excursion detection model 1", "excursion detection model 2" and "excursion detection model 3"). Although three excursion detection models are shown, any suitable number of excursion detection models can be used in accordance with implementations described herein. Each entry within the chart corresponds to a number of reviewable excursions. An entry of—indicates that are no reviewable excursions. In some implementations, each entry can be color coded. For example, a red box can indicate that there are reviewable excursions, while a blue box can indicate that are there are no reviewable excursions.

In some implementations, a reviewable excursion is a relevant excursion. For example, chart 500 can visually depict any relevant excursions of the at least one excursion and visually hide any irrelevant excursions of the at least one excursion. In some implementations, a reviewable excursion is an irrelevant excursion. For example, chart 500 can visually depict any irrelevant excursions of the at least one excursion and visually hide any irrelevant excursions of the at least one excursion.

Referring back to FIG. 3, as mentioned above, the excursion review dashboard can display a set of lists, where each list corresponds to a type of excursion (e.g., excursions not identified as relevant by the excursion screening model). For example, the set of lists can include a watch list identifying excursions that should be subject to further review (e.g., unknown excursions), an ignore list identifying excursions that have been identified by the excursion screening model as ignorable irrelevant excursions) and/or a false alarm list identifying excursions that have been identified by the excursion screening model as being false positive irrelevant excursions.

The watch list can include functionality to enable a user to classify an excursion displayed on the watch list. In some implementations, the watch list includes functionality to enable a user to indicate that an excursion on the watch list is a fault, indicate that an excursion on the watch list should be ignored, or indicate that an excursion on the watch list should be removed from the watch list. For example, the watch list can display, for each excursion on the watch list, a set of radio buttons selectable by the user to cause an action to be performed with respect to an excursion on the watch list (e.g., a fault button, an ignore button and a remove button). For example, if the user indicates that an excursion on the watch list should be ignored, then the excursion can be transferred to the ignore list and the overview can be updated accordingly (e.g., the number of excursions for the corresponding manufacturing equipment and excursion detection model can be decreased by one). In some implementations, the watch list can include drilldown functionality to enable a user to collapse an excursion into a number of individual components (e.g., process runs). The watch list can further include functionality that enables the user to classify a run (e.g., reclassify the run as a different excursion type or indicate that the run is normal). An illustrative example of a watch list is shown with reference to FIG. 6A.

Figure 6B:
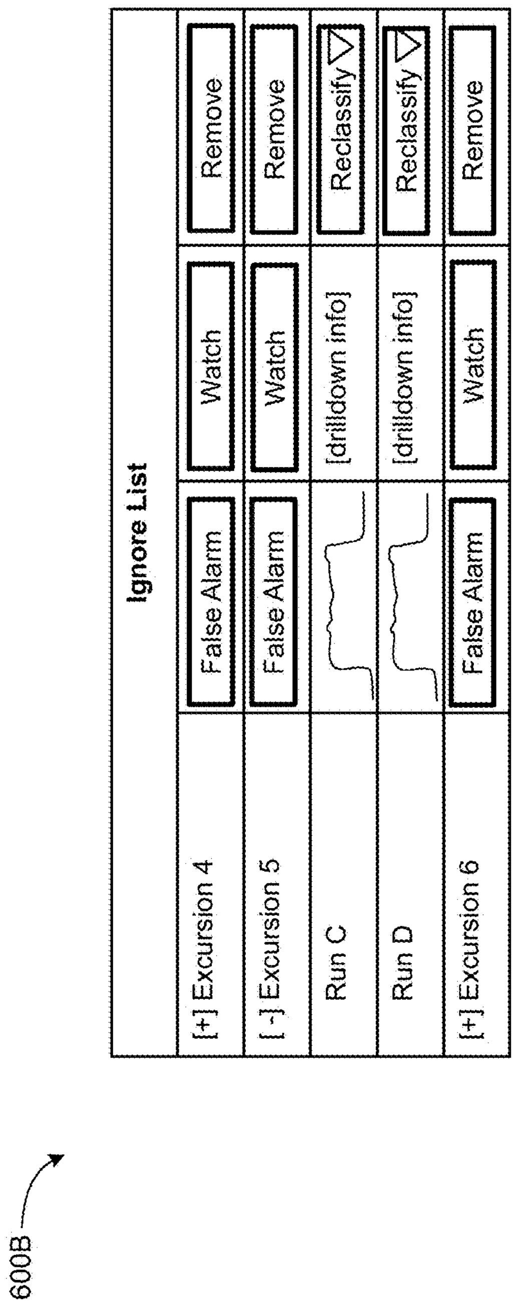

The ignore list can include functionality to enable a user to classify an excursion displayed on the ignore list. In some implementations, the ignore list includes functionality to enable a user to indicate that an excursion on the watch list is a false positive ("false alarm"), indicate that an excursion on the ignore list should be watched (e.g., moved to the watch list), or indicate that an excursion on the ignore list should be removed from the ignore list. For example, the ignore list can display, for each excursion on the ignore list, a set of radio buttons selectable by the user to cause an action to be performed with respect to an excursion on the ignore list (e.g., a false alarm button, a watch button and a remove button). In some implementations, the ignore list can include drilldown functionality to enable a user to collapse an excursion into a number of individual components (e.g., process runs). The ignore list can further include functionality that enables the user to classify a run (e.g., reclassify the run as a different excursion type or indicate that the run is normal). An illustrative example of an ignore list is shown with reference to FIG. 6B.

Figure 6C:
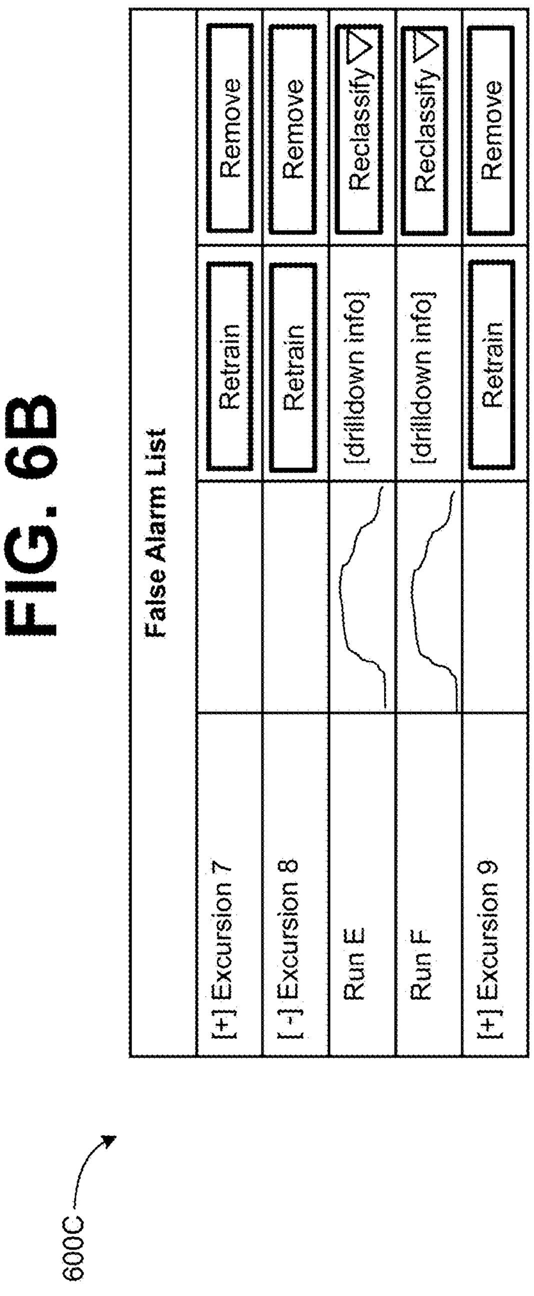

The false alarm list can include functionality to enable a user to classify an excursion displayed on the false alarm list. In some implementations, the ignore list includes functionality to enable a user to indicate that an excursion is not a false alarm. For example, the functionality can cause the excursion screening model to be retrained based on the indication that the excursion is not a false alarm. In some implementations, the ignore list includes functionality indicating that an excursion on the false alarm list should be removed from the false alarm list. For example, the false alarm list can display, for each excursion on the false alarm list, a set of radio buttons selectable by the user to cause an action to be performed with respect to an excursion on the false alarm list (e.g., a retrain button and a remove button). In some implementations, the false alarm list can include drilldown functionality to enable a user to collapse an excursion into a number of individual components (e.g., process runs). The false alarm list can further include functionality that enables the user to classify a run (e.g., reclassify the run as a different excursion type or indicate that the run is normal). An illustrative example of a false alarm list is shown with reference to FIG. 6C.

Figure 4:
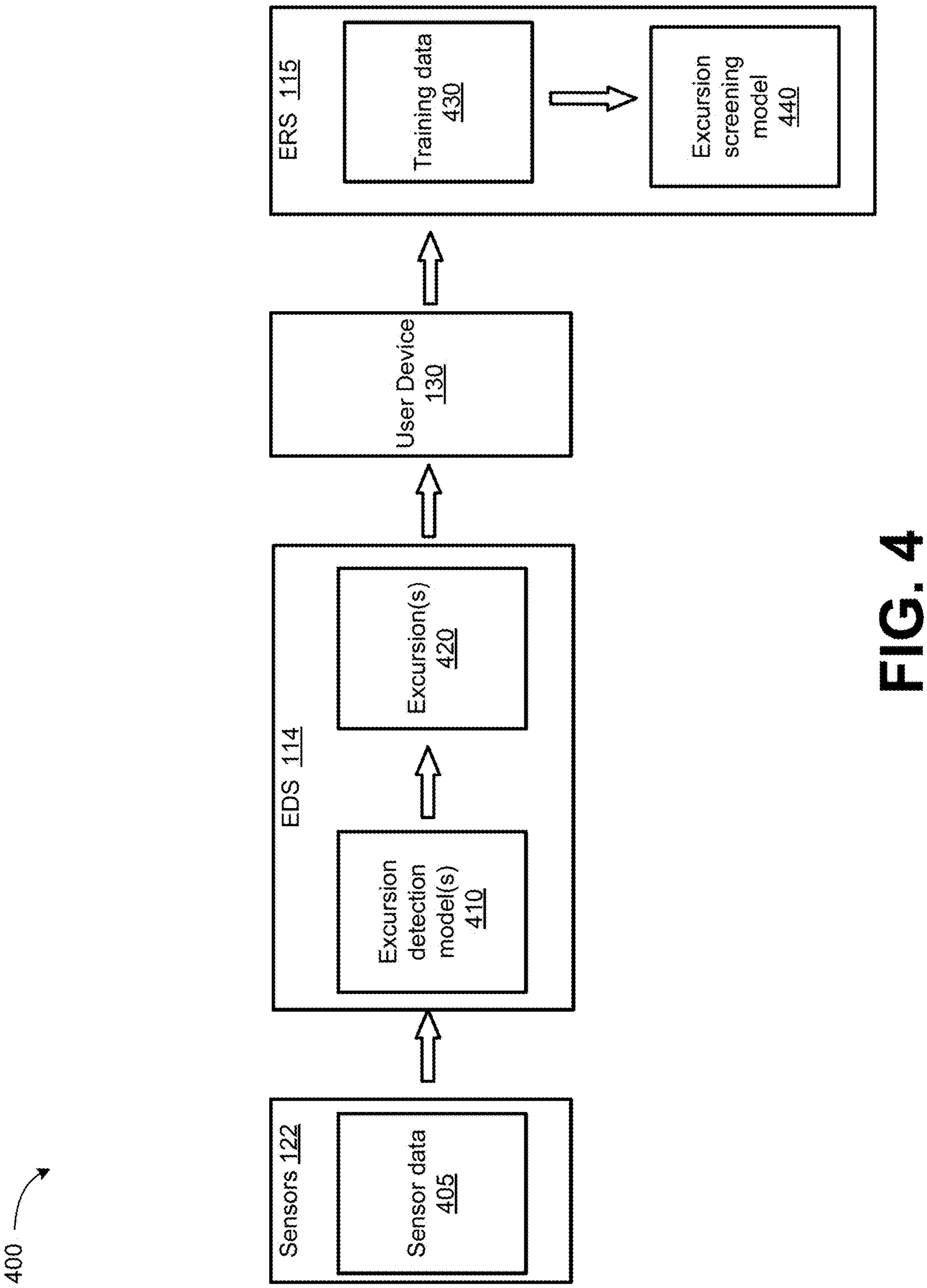
FIG. 4 is a diagram illustrating an example system/method for training an excursion screening model used to screen excursions, in accordance with some implementations of the present disclosure.

FIG. 4 is a diagram 400 illustrating an example system/method for training an excursion screening model used to screen excursions, in accordance with some implementations of the present disclosure. As shown, sensors 122 (e.g., as described in further detail above with reference to FIG. 1) can generate sensor data 405 (e.g., sensor statistics). In some implementations, the sensor data 405 includes trace data.

One or more excursion detection models 410 of EDS 114 (e.g., as described in further detail above with reference to FIG. 1) can be used to detect the existence of any excursions from the sensor data 405. The excursion detection model(s) 410 can be similar to the excursion detection models 310 of FIG. 3. In this illustrative example, one or more detected excursions 420 have been detected from the sensor data 305 using the excursion detection model(s) 410. The detected excursion(s) 420 can be similar to the detected excursion(s) 320 of FIG. 1.

The detected excursion(s) 420 can then be sent to the at least one user device 130 (e.g., as described in further detail above with reference to FIG. 1). For example, the detected excursion(s) 420 can be displayed on a user interface (e.g., GUI). A user can review the detected excursion(s) 420 and generate excursion screen model training data ("training data") 430 by classifying each detected excursion of the detected excursion(s) 420 as being a relevant excursion or an irrelevant excursion. For example, the training data 430 can include feedback data. For example, an irrelevant excursion can be an excursion classified by the user as being a false positive excursion, an unimportant excursion, etc., as described in further detail above with reference to FIG. 1. A relevant excursion can be an excursion classified by the user as a true excursion, or an unknown excursion that may necessitate further review, as described in further detail above with reference to FIG. 1.

The training data 430 (e.g., including the feedback data) can be sent to ERS 115 (e.g., as described in further detail above with reference to FIG. 1) for training an excursion screening model 440. The excursion screening model 440 can be similar to the excursion screening model 330 of FIG. 3. Training the excursion screening model 440 can include training the excursion screening model 440 to screen future detected excursions detected by the excursion detection model(s) 410. More specifically, the excursion screening model 440 can be trained to determine whether any relevant excursions exist within the future detected excursions.

The excursion screening model 440 can be a machine learning model that is trained to identify relevant excursions and/or irrelevant excursions. In some implementations, training the excursion screening model 440 includes training the excursion screening model 440 to perform pattern matching to classify a detected excursion as a relevant excursion or an irrelevant excursion. The excursion screening model 440 can be trained to perform pattern matching using any suitable training method. In some implementations, the excursion screening model is trained to perform pattern matching using at least one supervised learning technique. Examples of supervised learning techniques include few shot, a similarity search, etc. Further details regarding training the excursion screening model 330 to perform pattern matching to classify each of the detected excursion(s) 320 (e.g., using a supervised learning technique) will be described herein below with reference to FIG. 4.

An excursion screening model can be trained to perform classifications using any suitable approach. In some implementations, the excursion screening model is trained using few shot classification. Few shot classification can train the excursion screening model from a small number of labeled samples. A shot refers to a data point used to train the excursion screening model. For example, a one shot approach uses a single data point, a two shot approaches uses two data points, etc. The few shot approach can reduce computational resource consumption and thus improve the ability of a processing device to implement the excursion screening model.

The excursion screening model can be trained to perform few shot classification using any suitable learning method (e.g., supervised learning method, unsupervised learning method and/or semi-supervised learning method). In some implementations, the excursion screening model is trained to perform few shot classification using a Gramian angular field (GAF) method. In a GAF method, sensor data, as time series data, can be converted into an image that represents the sensor data and preserves the temporal dependency of the sensor data by using a Gram matrix. The Gram matrix of a set of vectors is a matrix used to determine the linear dependence of the set of vectors, in which each entry of the Gram matrix is a respective dot product of a pair of vectors of the set of vectors. The values of each entry of the Gram matrix can be mapped into a GAF. In some implementations, the sensor data includes univariate time series data correspond to a one-dimensional (1D) space, and the sensor data is encoded into a two-dimension (2D) space using a 2D encoding method prior to generating the Gram matrix. The sensor data can be scaled into a desired range of output values prior to using the 2D encoding method. The 2D encoding method can be a bijective encoding that preserves the temporal dependency of the sensor data. In some implementations, the 2D encoding method is a polar encoding method. A polar encoding method converts, for each x-y pair of the sensor data (i.e., time-value pair), the time x into an angle θ of a polar coordinate and the value y into a radius r of the polar coordinate. For example, the angle for time $x_i$, $\theta_i$, can be computed as the inverse cosine of $x_i$, $\arccos(x_i)$, where i is a non-negative integer. The radius for the y value corresponding to $x_i$ ($r_i$) can be computed as i/N, where N is a positive integer. Each entry of the resulting Gram matrix can be the cosine of the sum of a respective pair of angles of a polar coordinate. For example, for indices i and j (where j is also a non-negative integer), the entry in the Gram matrix can be represented by $\cos(\theta_i+\theta_j)$. An illustrative example of converting sensor data into images (e.g., to perform few shot classification) will be described below with reference to FIGS. 7A-7B. Other examples of methods that can be used to train an excursion screening model include metric learning, k-nearest neighbors (k-NN), a gradient-based methods, transfer learning methods, propagation methods (e.g., embedding and/or label propagation), graph neural network (GNN) methods, etc.

Figure 7A:
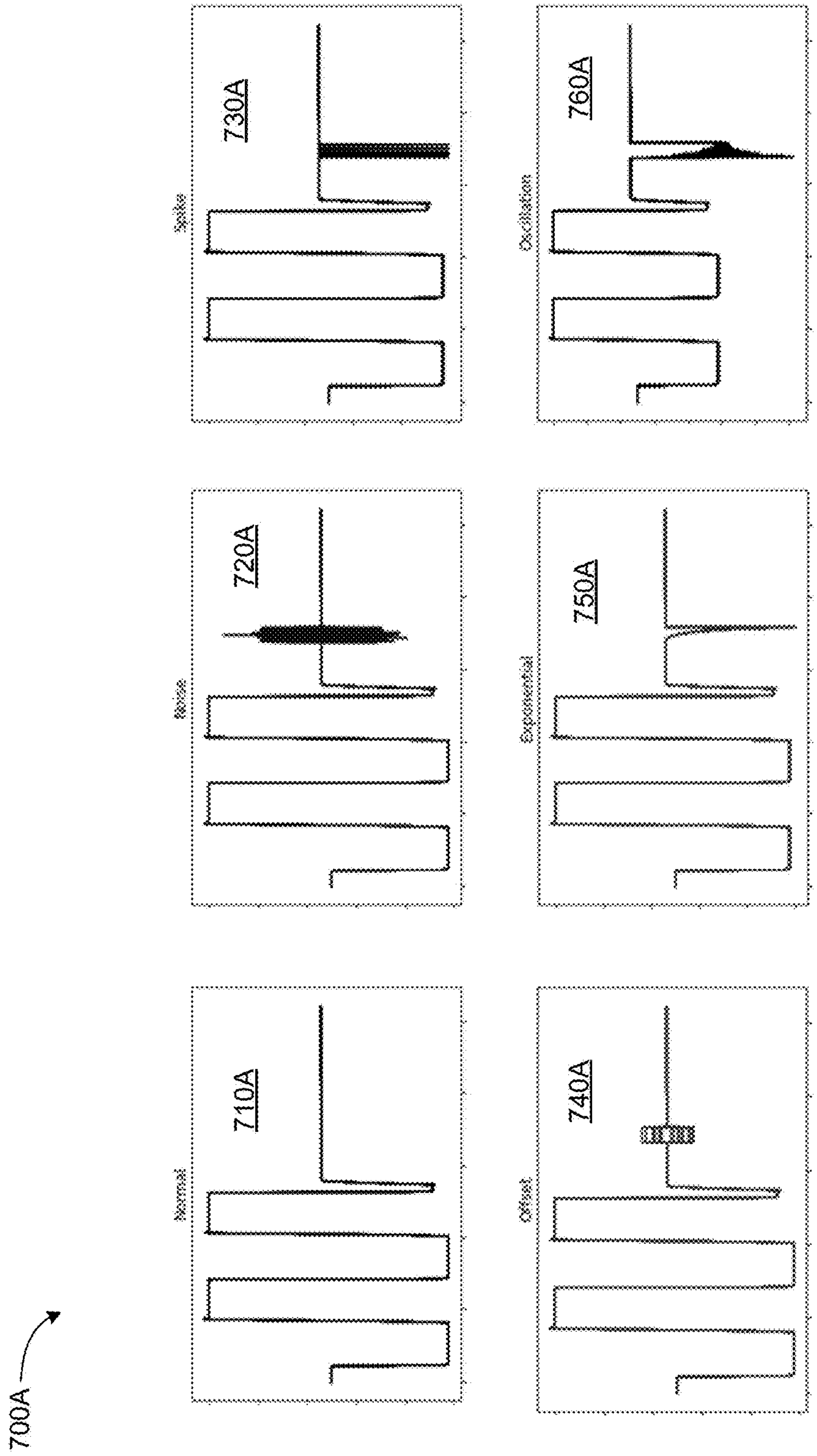
FIGS. 7A-7B are diagrams illustrating example conversions of sensor data into images used to classify excursions, in accordance with some implementations.
Figure 7B:
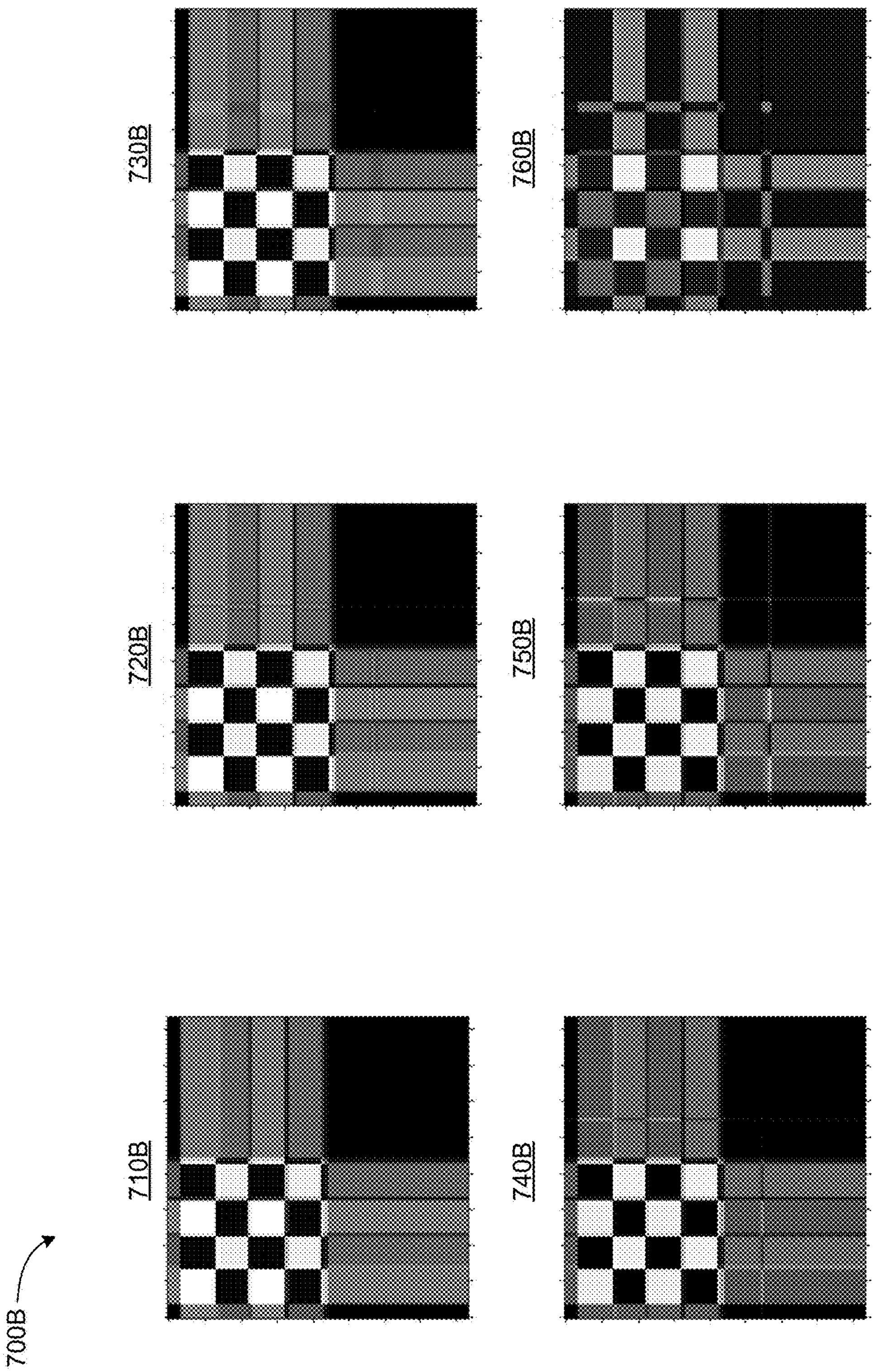

FIGS. 7A-7B are diagrams illustrating an example method of training an excursion screening model to perform patching matching, in accordance with some implementations. FIG. 7A is a diagram 700A showing various types of sensor data 710A-760A. For example, sensor data 710A lacks an excursion (referred to as a "normal excursion"). Sensor data 720A includes a noise excursion. Sensor data 730A includes a spike excursion. Sensor data 740A includes an offset excursion. Sensor data 750A includes an exponential excursion. Sensor data 760A includes an oscillation excursion. Accordingly, each of sensor data 750A can be defined by a respective excursion type (e.g., normal, noise, spike, offset, exponential and oscillation).

FIG. 7B is a diagram 700B showing the conversion of each of sensor data 710A-760A to a respective one of images 710B-760B. More specifically, sensor data 710A is converted to image 710B, sensor data 720A is converted to image 720B, sensor data 730A is converted to image 730B, sensor data 740A is converted to image 740B, sensor data 750A is converted to image 750B, and sensor data 760A is converted to image 760B.

The images 710B-760B can then be used to train an excursion screening model to classify an excursion type (e.g., normal, noise, spike, offset, exponential or oscillation) to an input image converted from sensor data. More specifically, the excursion screening model can include a classifier that is trained to perform pattern matching using images of converted sensor data.

In some implementations, the excursion screening model is trained to perform similarity search. Generally, similarity search refers to techniques that are used to identify, for a given input data item, a similar data item to the given input data item. A similarity search method herein can be used to determine whether a visual representation of sensor data (e.g., time series data) is similar to another visual representation of sensor data. Illustrative examples of performing a similarity search will be described below with reference to FIGS. 8A-8B.

Figure 8A:
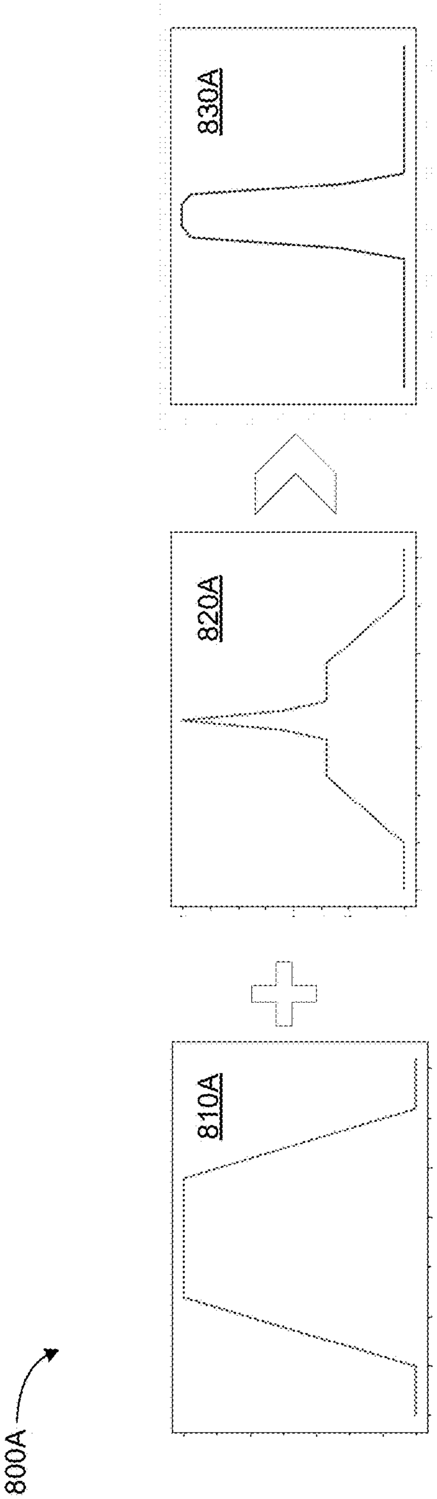
FIGS. 8A-8B are diagrams illustrating example profiles used to classify excursions, in accordance with some implementations.
Figure 8B:
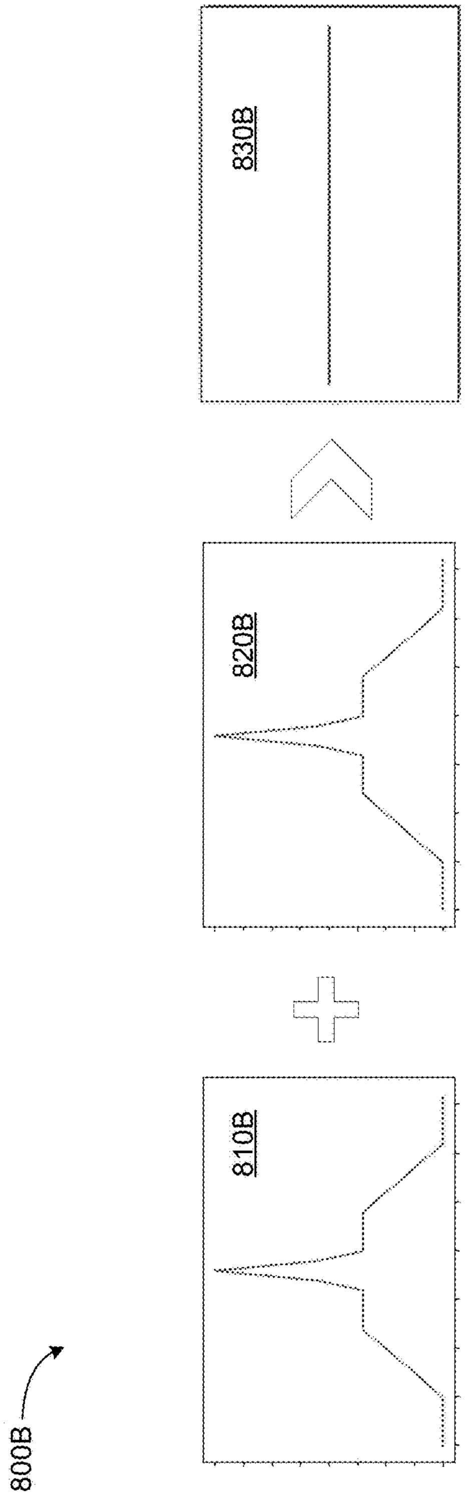

FIGS. 8A-8B are diagrams illustrating an example method of training an excursion screening model to perform patching matching, in accordance with some implementations. More specifically, the excursion screening model can be trained to perform similarity search. FIG. 8A is a diagram 800A showing various types of sensor data 810A and 820A. For example, sensor data 810A lacks an excursion (referred to as a "normal excursion") and sensor data 820B includes a spike excursion. The combination of sensor data 810A and sensor data 820A results in a profile 830A (e.g., a matrix profile). Since sensor data 810A and sensor data 820A are different excursion types, the resulting profile 830A has a relatively large profile curve. Thus, the excursion screening model can be trained to identify that sensor data 810A is not similar to sensor data 820A.

FIG. 8B is a diagram 800B showing various types of sensor data 810B and 820B. For example, sensor data 810B and sensor data 820 each include a spike excursion. The combination of sensor data 810B and sensor data 820B results in a profile 830B (e.g., a matrix profile). Since sensor data 810B and sensor data 820B are similar excursion types, the resulting profile 830B has a relatively small profile curve. Thus, the excursion screening model can be trained to identify that sensor data 810B is similar to sensor data 820B.

Figure 9A:
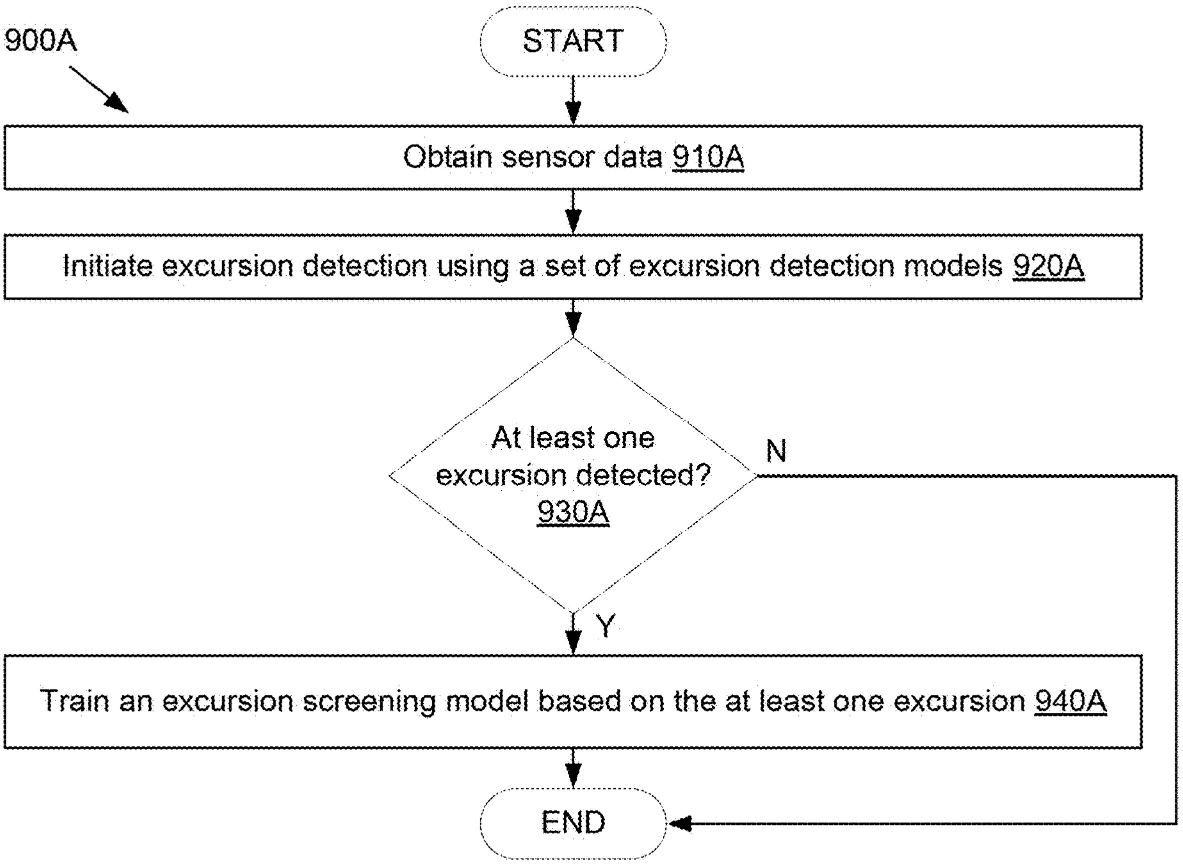
FIG. 9A is a flow chart of a method for training an excursion classification model to classify excursions in sensor data, in accordance with some implementations of the present disclosure.

FIG. 9A is a flow chart of a method 900A for training an excursion screening model to classify excursions in sensor data, according to some implementations of the present disclosure. Method 900A is performed by processing logic that can include hardware (circuitry, dedicated logic, etc.), software (such as is run on a general purpose computer system or a dedicated machine), firmware, or some combination thereof. In some implementations, method 900A is performed by a computer system, such as data processing system 110 of FIG. 1. In other or similar implementations, one or more operations of method 900A can be performed by one or more other machines.

At operation 910A, processing logic obtains sensor data. The sensor data can include time series data. The sensor data can be obtained from a set of sensors of a manufacturing system. For example, obtaining the sensor data can include receiving raw sensor data from the set of sensors, and processing the raw sensor data to obtain the sensor data. In some implementations, the sensor data includes trace data. Each sensor of the set of sensors can generate raw sensor data from a manufacturing process performed by manufacturing equipment. In some implementations, the manufacturing equipment includes a set of processing tools. For example, the manufacturing system can be an electronic device manufacturing system, and the set of processing tools can be a set of substrate (e.g., wafer) processing tools for processing substrates used to form electronic devices (e.g., semiconductor devices). The manufacturing process can be performed using at least one process recipe.

At operation 920A, processing logic initiates excursion detection using a set of excursion detection models. The set of excursion detection models can include one or more excursion detection models for detecting any excursions that exist within a manufacturing system. In some implementations, the set of excursion detection modes includes a plurality of excursion detection models. For each the plurality of excursion detection models can be included in an excursion detection ensemble. Each excursion detection model of the plurality of excursion detection models can be independently tailored (e.g., trained) to perform a respective excursion detection task. Accordingly, multiple excursion detection tasks can be performed in parallel using the plurality of excursion detection models.

At operation 930A, processing logic determines whether at least one excursion is detected using the set of excursion detection models. If not, then the process can end. For example, the process can restart at operation 910A to obtain new sensor data.

At operation 940A, if at least one excursion is detected, then processing logic can train an excursion detection model based on the at least one excursion. In some implementations, the excursion detection model is trained to perform pattern matching based on the at least one excursion, as described above with reference to FIGS. 4 and 7A-8B. In some implementations, training the excursion detection model includes receiving feedback data related to the at least one excursion from a user device. For example, processing logic can cause the at least one excursion to be displayed on at least one list (e.g., overview, watch list, ignore list and/or false alarm list) via a user interface. A user can select, via the user interface, an action to classify the excursion, and the selection of the action can generate feedback data that can be used to refine the excursion screening model. For example, for an excursion on a watch list, the action can be an action to classify the excursion as a true excursion (e.g., fault), an action to ignore the excursion, an action to remove the excursion from the watch list, etc. As another example, for an excursion on an ignore list, the action can be an action to classify the excursion as a false alarm an action to move the excursion to the watch list, an action to remove the excursion from the ignore list, etc. As yet another example, for an excursion on the false alarm list, the action can be an action to retrain the excursion screening model, an action to remove the excursion from the false alarm list, etc. Further details regarding the at least one list and actions to classify the excursion are described above with reference to FIGS. 3-6C. Further details regarding operations 910A-940A are described above with reference to FIGS. 1-8B.

Figure 9B:
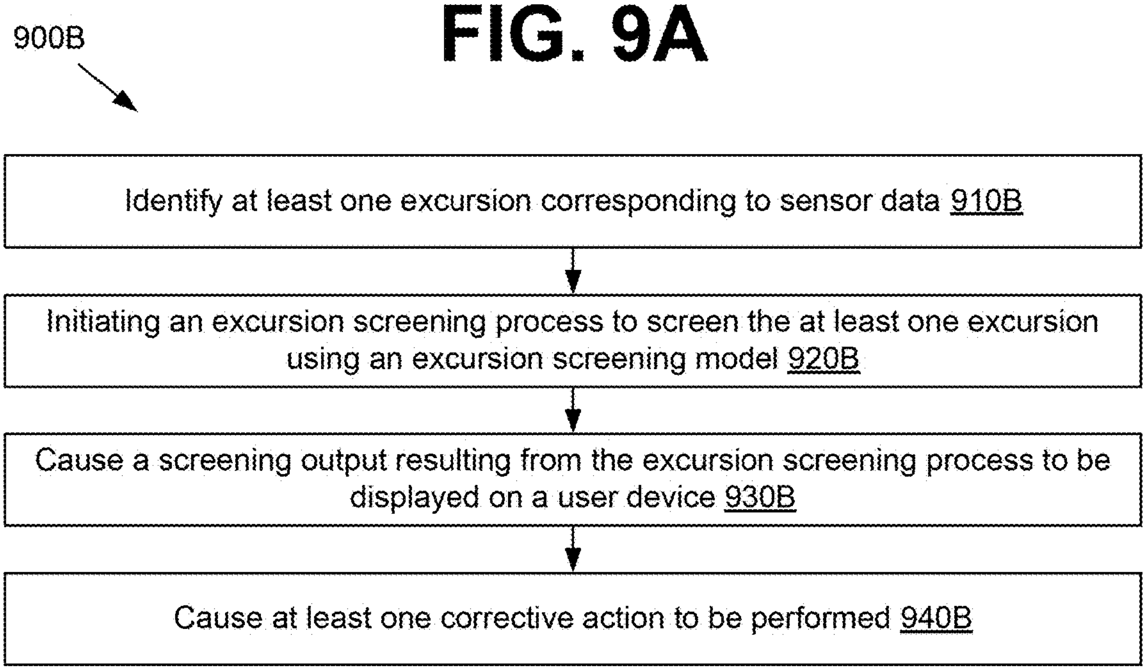
FIG. 9B is a flow chart of a method for using an excursion classification model to classify excursions in sensor data, in accordance with some implementations of the present disclosure.

FIG. 9B is a flow chart of a method 900B for using an excursion screening model to classify excursions in sensor data, according to some implementations of the present disclosure. Method 900B is performed by processing logic that can include hardware (circuitry, dedicated logic, etc.), software (such as is run on a general purpose computer system or a dedicated machine), firmware, or some combination thereof. In some implementations, method 900B is performed by a computer system, such as data processing system 110 of FIG. 1. In other or similar implementations, one or more operations of method 900B can be performed by one or more other machines.

At operation 910B, processing logic identifies at least one excursion corresponding to sensor data obtained from a manufacturing system. The sensor data can include time series data. In some implementations, the sensor data includes trace data.

In some implementations, identifying the at least one excursion includes obtaining the sensor data from a set of sensors of the manufacturing system. For example, obtaining the sensor data can include receiving raw sensor data from the set of sensors, and processing the raw sensor data to obtain the sensor data. Each sensor of the set of sensors can generate raw sensor data from a manufacturing process performed by manufacturing equipment. In some implementations, the manufacturing equipment includes a set of processing tools. For example, the manufacturing system can be an electronic device manufacturing system, and the set of processing tools can be a set of substrate (e.g., wafer) processing tools for processing substrates used to form electronic devices (e.g., semiconductor devices). The manufacturing process can be performed using at least one process recipe.

In some implementations, identifying the at least one excursion further includes initiating excursion detection using a set of excursion detection models. The set of excursion detection models can include one or more excursion detection models for detecting any excursions that exist within a manufacturing system. In some implementations, the set of excursion detection modes includes a plurality of excursion detection models. For each the plurality of excursion detection models can be included in an excursion detection ensemble. Each excursion detection model of the plurality of excursion detection models can be independently tailored (e.g., trained) to perform a respective excursion detection task. Accordingly, multiple excursion detection tasks can be performed in parallel using the plurality of excursion detection models. In some implementations, identifying the at least one excursion further includes determining that at least one excursion is detected using the set of excursion detection models.

At operation 920B, processing logic initiates an excursion screening process using an excursion screening model. In some implementations, the excursion detection model is trained to classify each excursion (e.g., by performing pattern matching). For example, the excursion screening model can identify (e.g., classify) each excursion as a relevant excursion or an irrelevant excursion. The excursion screening model can be independent of each excursion detection model of the set of excursion detection models.

At operation 930B, processing logic can cause a screening output resulting from the excursion screening process to be displayed on a user device. The screening output can include an indication of least one relevant excursion and/or at least one irrelevant excursion. For example, processing logic can cause the at least one excursion to be displayed on at least one list (e.g., overview, watch list, ignore list and/or false alarm list) via a user interface. A user can select, via the user interface, an action to classify the excursion, and the selection of the action can generate feedback data that can be used to refine the excursion screening model. For example, for an excursion on a watch list, the action can be an action to classify the excursion as a true excursion (e.g., fault), an action to ignore the excursion, an action to remove the excursion from the watch list, etc. As another example, for an excursion on an ignore list, the action can be an action to classify the excursion as a false alarm an action to move the excursion to the watch list, an action to remove the excursion from the ignore list, etc. As yet another example, for an excursion on the false alarm list, the action can be an action to retrain the excursion screening model, an action to remove the excursion from the false alarm list, etc. Further details regarding the at least one list and actions to classify the excursion are described above with reference to FIGS. 3-6C.

At operation 940B, processing logic can cause at least one corrective action to be performed. The at least one corrective action can be performed to address at least one relevant excursion of the at least one excursion. For example, the at least one relevant excursion can be identified from the screening output. In some implementations, causing the at least one corrective action to be performed includes causing an alert to be generated on the user device. The alert can indicate a type of excursion. Each type of excursion can have an associated set of procedures used to address the type of excursion. In some implementations, the set of procedures is manually performed. In some implementations, causing the at least one corrective action to be performed includes causing a set of procedures to be automatically performed for a type of excursion.

Further details regarding operations 910B-940B are described above with reference to FIGS. 1-9A.

Figure 10:
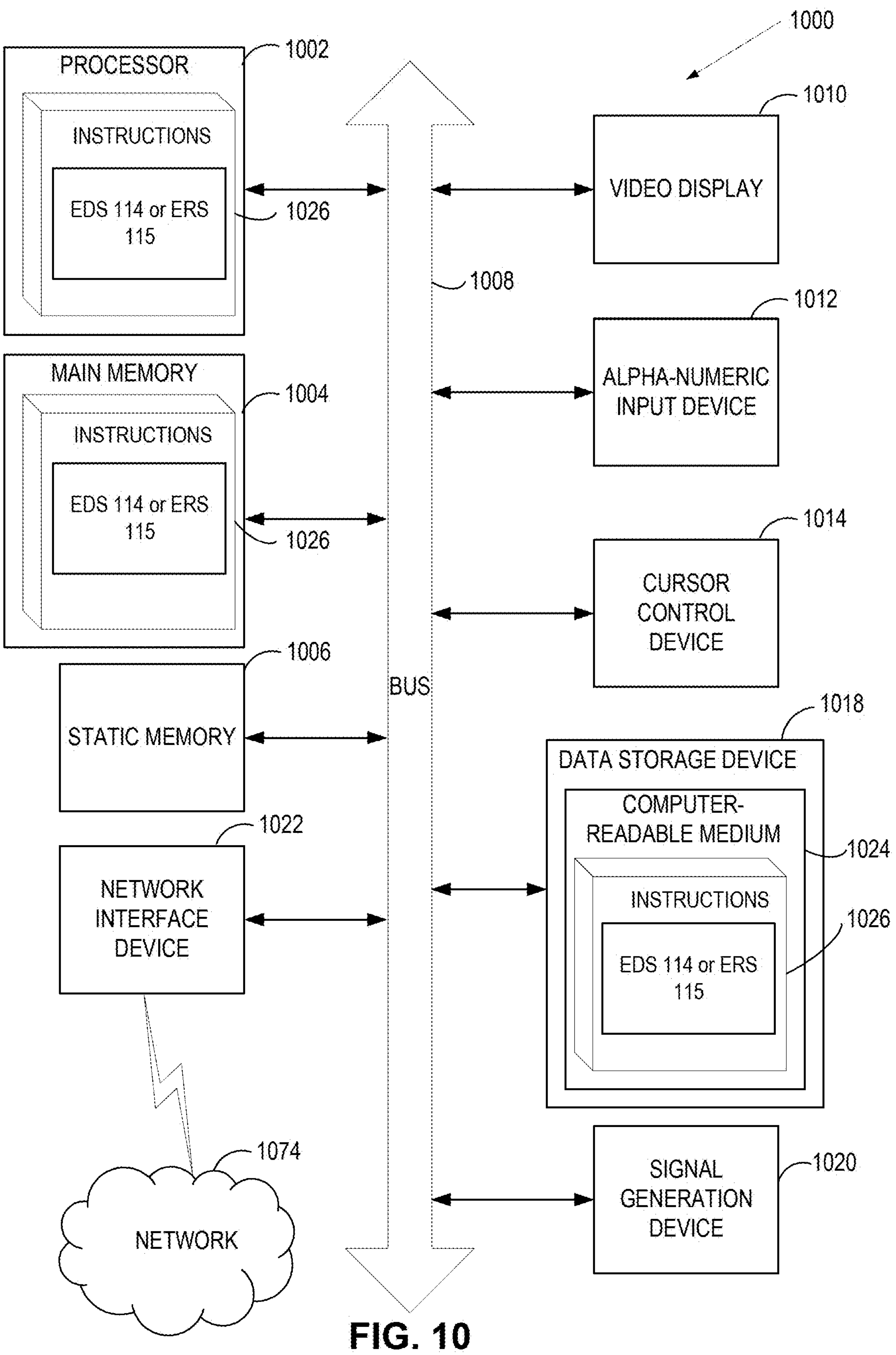
FIG. 10 is a block diagram illustrating a computer system, according to some implementations of the present disclosure.

FIG. 10 is a block diagram illustrating a computer system 1000, according to some implementations of the present disclosure. In some implementations, computer system 1000 can be connected (e.g., via a network, such as a Local Area Network (LAN), an intranet, an extranet, or the Internet) to other computer systems. Computer system 1000 can operate in the capacity of a server or a client computer in a client-server environment, or as a peer computer in a peer-to-peer or distributed network environment. Computer system 1000 can be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 can include a processing device 1002, a volatile memory 1004 (e.g., Random Access Memory (RAM)), a non-volatile memory 1006 (e.g., Read-Only Memory (ROM) or Electrically-Erasable Programmable ROM (EEPROM)), and a data storage device 1016, which can communicate with each other via a bus 1008.

Processing device 1002 can be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 1000 can further include a network interface device 1022 (e.g., coupled to network 1074). Computer system 1000 also can include a video display unit 1010 (e.g., an LCD), an alphanumeric input device 1072 (e.g., a keyboard), a cursor control device 1014 (e.g., a mouse), and a signal generation device 1020.

In some implementations, data storage device 1016 can include a non-transitory computer-readable storage medium 1024 on which can store instructions 1026 encoding any one or more of the methods or functions described herein, including instructions corresponding to components of FIG. 1 (e.g., EDS 114 and/or ERS 115) and for implementing methods described herein.

Instructions 1026 can also reside, completely or partially, within volatile memory 1004 and/or within processing device 1002 during execution thereof by computer system 1000, hence, volatile memory 1004 and processing device 1002 can also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "performing," "providing," "obtaining," "causing," "accessing," "determining," "adding," "using," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and cannot have an ordinal meaning according to their numerical designation.

Examples described herein also relate to an apparatus for performing the methods described herein. This apparatus can be specially constructed for performing the methods described herein, or it can include a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:

identifying, based on one or more outputs of one or more excursion detection models, at least one excursion corresponding to sensor data obtained from a manufacturing system;

initiating an excursion screening process to generate a screening output by screening the at least one excursion using an excursion screening model, wherein the excursion screening model is trained to classify the at least one excursion, and wherein the excursion screening model is independent of the one or more excursion detection models;

determining whether at least one relevant excursion is identified by the screening output, wherein the relevant excursion is an excursion classified by the excursion screening model as being indicative of an anomaly or a fault within the manufacturing system; and in response to determining that at least one relevant excursion is identified by the screening output, adjusting at least one operation parameter associated with at least one process performed by manufacturing equipment of the manufacturing system to address the at least one relevant excursion.

2. The method of claim 1, further comprising causing the at least one process to be controlled based on the at least one operation parameter.

3. The method of claim 1, wherein identifying the at least one excursion further comprises:

obtaining the sensor data from a set of sensors of the manufacturing system; and initiating excursion detection using one or more excursion detection models, wherein the excursion screening model is independent of the one or more excursion detection models.

4. The method of claim 1, wherein the excursion screening model is trained to classify the at least one excursion using pattern matching.

5. The method of claim 1, wherein the screening output indicates that the at least one excursion further comprises an irrelevant excursion, wherein the irrelevant excursion is an excursion classified by the excursion screening model as being a false positive or unimportant for consideration.

6. The method of claim 1, wherein the screening output visually depicts the at least one relevant excursion and visually hides at least one irrelevant excursion of the at least one excursion, wherein the at least one irrelevant excursion is an excursion classified by the excursion screening model as being a false positive or unimportant for consideration.

7. The method of claim 2, wherein causing the screening output to be displayed on a user device further comprises causing a set of lists to be displayed via a user interface, and wherein the set of lists comprises at least one of: a watch list, an ignore list or a false alarm list.

8. The method of claim 1, further comprising receiving, from a user device, feedback data used to refine the excursion screening model.

9. A system, comprising:

a memory device; and a processing device, operatively coupled to the memory device, to perform operations comprising:

identifying, based on one or more outputs of one or more excursion detection models, at least one excursion corresponding to sensor data obtained from a manufacturing system;

initiating an excursion screening process to generate a screening output by screening the at least one excursion using an excursion screening model, wherein the excursion screening model is trained to classify the at least one excursion, and wherein the excursion screening model is independent of the one or more excursion detection models;

determining whether at least one relevant excursion is identified by the screening output, wherein the relevant excursion is an excursion classified by the excursion screening model as being indicative of an anomaly or a fault within the manufacturing system; and in response to determining that at least one relevant excursion is identified by the screening output, adjusting at least one operation parameter associated with at least one process performed by manufacturing equipment of the manufacturing system to address the at least one relevant excursion.

10. The system of claim 9, wherein the operations further comprise causing the at least one process to be controlled based on the at least one operation parameter.

11. The system of claim 9, wherein identifying the at least one excursion further comprises:

obtaining the sensor data from a set of sensors of the manufacturing system; and initiating excursion detection using one or more excursion detection models, wherein the excursion screening model is independent of the one or more excursion detection models.

12. The system of claim 9, wherein the excursion screening model is trained to classify the at least one excursion using pattern matching.

13. The system of claim 9, wherein the screening output indicates that the at least one excursion further comprises an irrelevant excursion, wherein the irrelevant excursion is an excursion classified by the excursion screening model as being a false positive or unimportant for consideration.

14. The system of claim 9, wherein the screening output visually depicts the at least one relevant excursion and visually hides at least one irrelevant excursion of the at least one excursion, wherein the at least one irrelevant excursion is an excursion classified by the excursion screening model as being a false positive or unimportant for consideration.

15. The system of claim 10, wherein causing the screening output to be displayed on a user device further comprises causing a set of lists to be displayed via a user interface, and wherein the set of lists comprises at least one of: a watch list, an ignore list or a false alarm list.

16. The system of claim 9, wherein the operations further comprise receiving, from a user device, feedback data used to refine the excursion screening model.

17. A method, comprising:

obtaining sensor data from a set of sensors of a manufacturing system;

initiating excursion detection using the sensor data and one or more excursion detection models;

determining whether at least one excursion is detected by the one or more excursion detection models; and in response to determining that at least one excursion is detected by the one or more excursion detection models, training an excursion screening model to classify the at least one excursion based on the at least one excursion, wherein the excursion screening model is independent of the one or more excursion detection models.

18. The method of claim 17, wherein training the excursion screening model comprises training the excursion screening model to classify the at least one excursion using pattern matching.

19. The method of claim 17, wherein training the excursion screening model further comprises:

causing a screening output resulting from a screening process to be displayed on a user device, wherein the screening output indicates that the at least one excursion comprises at least one of: a relevant excursion or an irrelevant excursion; and receiving, from the user device, feedback data used to refine the excursion screening model.

20. The method of claim 19, wherein causing the screening output to be displayed on a user device further comprises causing a set of lists to be displayed via a user interface, and wherein the set of lists comprises at least one of: a watch list, an ignore list or a false alarm list.

* * * * *